US012737942B2

(12) United States Patent
Kadowaki

(10) Patent No.: US 12,737,942 B2
(45) Date of Patent: Sep. 15, 2026

(54) INFORMATION PROCESSING APPARATUS, PROGRAM, AND SYSTEM FOR ADJUSTING STROKE DATA BASED ON LEARNING INFORMATION

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 198 days.

(21) Appl. No.: 18/451,034

(22) Filed: Aug. 16, 2023

(65) Prior Publication Data

US 2023/0394721 A1 Dec. 7, 2023

Related U.S. Application Data

(63) Continuation of application No. PCT/JP2021/034979, filed on Sep. 24, 2021.

(51) Int. Cl.

*G06T 11/23* (2026.01)
*G06F 3/0354* (2013.01)
*G06T 3/40* (2024.01)
*G06T 11/60* (2026.01)

(52) U.S. Cl.

CPC .......... *G06T 11/23* (2026.01); *G06F 3/03545* (2013.01); *G06T 3/40* (2013.01); *G06T 11/60* (2013.01)

(58) Field of Classification Search

None

See application file for complete search history.

(56) References Cited

U.S. PATENT DOCUMENTS

2004/0148577 A1 7/2004 Xu et al.
2009/0021530 A1* 1/2009 Ishiguro .............. G06F 3/04883 345/619
2015/0199582 A1* 7/2015 Okamoto ......... G06V 30/19147 382/182
2017/0004122 A1* 1/2017 Taniguchi ........... G06F 3/04883
2017/0068445 A1* 3/2017 Lee ........................ G06F 40/171
2021/0134029 A1* 5/2021 Kim ..................... G06V 10/267
2021/0150122 A1* 5/2021 Nakano ............... G06F 16/3334

OTHER PUBLICATIONS

International Search Report mailed Nov. 2, 2021, corresponding to International Application PCT/JP2021/034979, filed Sep. 24, 2021, 2 pages (English Translation).

* cited by examiner

*Primary Examiner* — Jeffrey J Chow
(74) *Attorney, Agent, or Firm* — Seed Intellectual Property Law Group LLP

(57) ABSTRACT

Provided is an information processing apparatus including a processor and a memory storing instructions that, when executed by the processor, cause the information processing apparatus to: acquire learning information representing a result of learning on a spatial relation between adjacent objects, perform a recognition process on stroke data representing a collection of strokes to recognize a first object and a second object that has been inputted via a writing input after the first object, and perform an adjustment process on the stroke data based on the learning information such that a position or size of the second object is adjusted with the first object being fixed.

10 Claims, 19 Drawing Sheets

FIG. 7

INFORMATION PROCESSING APPARATUS, PROGRAM, AND SYSTEM FOR ADJUSTING STROKE DATA BASED ON LEARNING INFORMATION

BACKGROUND

Technical Field

The present disclosure relates to an information processing apparatus, a program, and a system.

Description of the Related Art

An information processing apparatus for a user to input content such as characters or picture, by hand has been known. For example, Japanese Patent Laid-Open No. 2020-024756 (hereinafter, referred to as Patent Document 1) discloses a method by which a user modifies hand-written data once stored in a file while checking how the hand-written data is displayed.

However, the method disclosed in Patent Document 1 requires operations for checking and modifying the data, and involves a corresponding increase in a burden on the user.

BRIEF SUMMARY

The present disclosure has been conceived of in view of the above circumstances to provide an information processing apparatus, a program, and a system which allow various types of information obtained through a writing operation to be automatically corrected at appropriate times.

An information processing apparatus according to a first embodiment of the present disclosure includes a processor; and a memory storing instructions that, when executed by the processor, cause the information processing apparatus to: acquire learning information representing a result of learning on a spatial relation between adjacent objects, perform a recognition process on stroke data representing a collection of strokes to recognize a first object and a second object that has been inputted via a writing input after the first object, and perform an adjustment process on the stroke data based on the learning information such that a position or size of the second object is adjusted with the first object being fixed.

A non-transitory computer-readable storage medium according to a second embodiment of the present disclosure stores one or more information processing programs that, when executed by one or more processors, cause one or more computers to: acquire learning information representing a result of learning on a spatial relation between adjacent objects, perform a recognition process on stroke data representing a collection of strokes to recognize a first object and a second object that has been inputted via a writing input after the first object, and perform an adjustment process on the stroke data on the basis of the acquired learning information such that a position or size of the second object is adjusted with the recognized first object being fixed.

An information processing apparatus according to a third embodiment of the present disclosure includes a processor; and a memory storing instructions that, when executed by the processor, cause the information processing apparatus to: acquire learning information representing a result of learning on a spatial or semantic relation between strokes constituting an object, perform a recognition process on stroke data representing a collection of strokes to recognize a first stroke group and a second stroke inputted via a writing input after the first stroke group, the first stroke group being made up of one or more strokes, and perform an adjustment process on the stroke data based on the learning information such that a position or shape of the second stroke is adjusted with the first stroke group being fixed.

A non-transitory computer-readable storage medium according to a fourth embodiment of the present disclosure stores one or more information processing programs that when executed by one or more processors, cause one or more computers to: acquire learning information representing a result of learning on a spatial or semantic relation between strokes constituting an object, perform a recognition process on stroke data representing a collection of strokes to recognize a first stroke group and a second stroke inputted via a writing input after the first stroke group, the first stroke group being made up of one or more strokes, and perform an adjustment process on the stroke data on the basis of the acquired learning information such that the second stroke is adjusted with the recognized first stroke group being fixed.

An information processing system according to a fifth embodiment of the present disclosure includes a pointing device that, in operation, indicates a position, a detection device that detects the position indicated by the pointing device, an imaging device that, in operation, captures a place in which the pointing device is used, and acquires an imaging signal, and an information processing apparatus that, in operation, communicates with the detection device or the imaging device, in which the information processing apparatus includes a processor; and a memory storing instructions that, when executed by the processor, cause the information processing apparatus to: selectively operate in one of a first writing mode in which a position in a first coordinate space corresponding to a sensor region on the detection device is calculated as the position indicated by the pointing device, and a second writing mode in which a position in a second coordinate space corresponding to a camera region of the imaging device is calculated as the position indicated by the pointing device, and generate digital ink data describing one or more strokes each representing a locus of the position in the first coordinate space or the second coordinate space.

A non-transitory computer-readable storage medium according to a sixth embodiment of the present disclosure is a non-transitory computer-readable storage medium storing one or more programs that, when executed by one or more processors, cause an information processing apparatus to perform a plurality of acts, wherein the information processing apparatus is part of an information processing system including a pointing device that, in operation, indicates a position, a detection device that detects the position indicated by the pointing device, an imaging device that, in operation, captures a place in which the pointing device is used, and acquires an imaging signal, and the information processing apparatus, wherein the information processing apparatus, in operation, communicates with the detection device or the imaging device. The acts include selectively operating in one of a first writing mode in which a position in a first coordinate space corresponding to a sensor region on the detection device is calculated as the position indicated by the pointing device, and a second writing mode in which a position in a second coordinate space corresponding to a camera region of the imaging device is calculated as the position indicated by the pointing device, and generate digital ink data describing one or more strokes each representing a locus of the calculated position in the first coordinate space or the second coordinate space.

The first to fourth embodiments of the present disclosure enable various types of information obtained through a writing operation to be automatically corrected at appropriate times. The fifth and sixth embodiments of the present disclosure enable appropriate use of the two types of coordinate spaces for writing input of strokes.

BRIEF DESCRIPTION OF THE SEVERAL VIEWS OF THE DRAWINGS

FIG. 7 is a flowchart illustrating an example operation in which the user device illustrated in FIGS. 1 and 2 adjusts an object;

DETAILED DESCRIPTION

Figure 1:
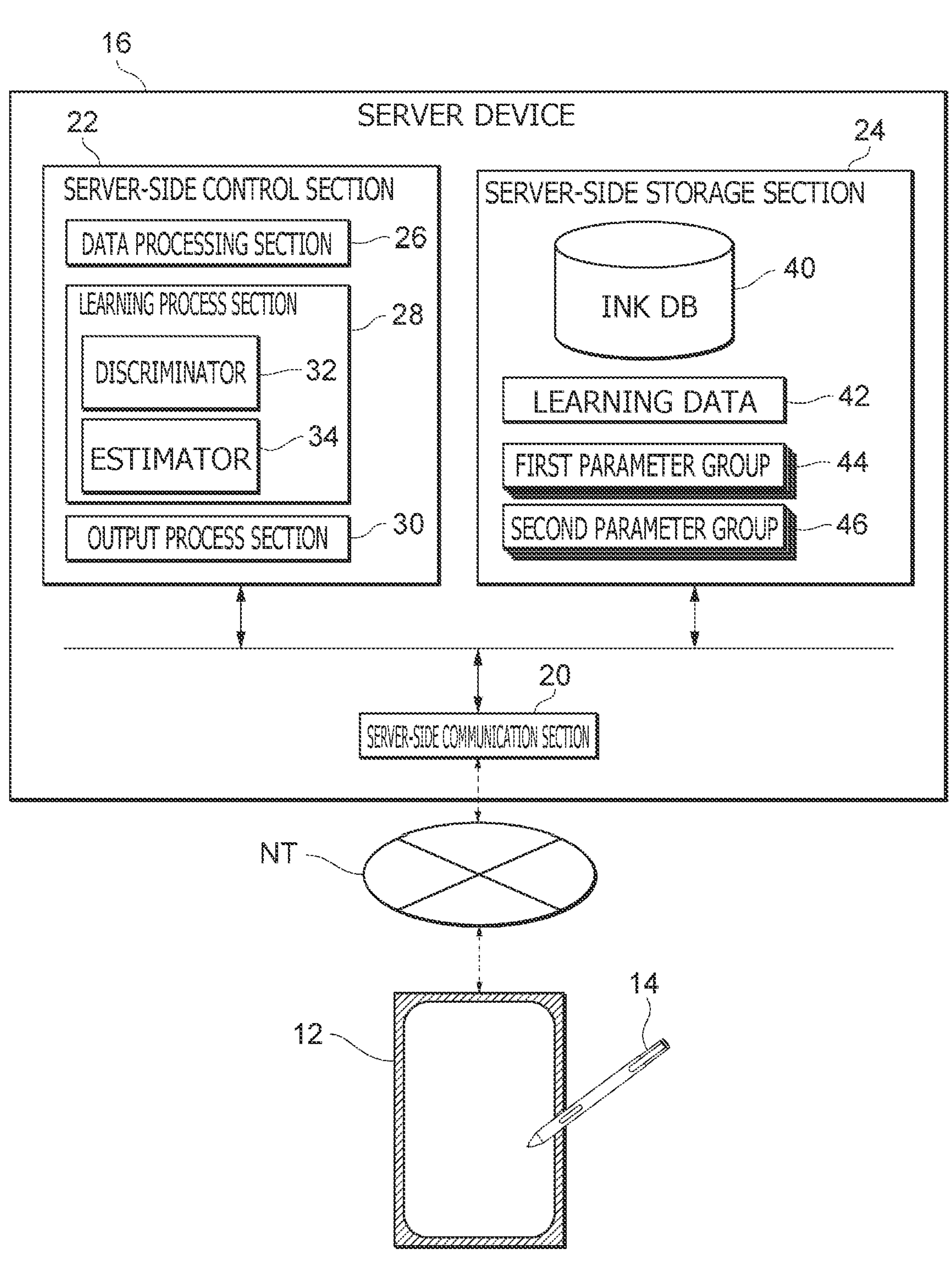
FIG. 1 is an overall configuration diagram of an information processing system according to a first embodiment of the present disclosure.

Hereinafter, embodiments of the present disclosure will be described with reference to the accompanying drawings. In the accompanying drawings, to make it easier to understand the following description, like constituent elements are denoted by like reference characters wherever possible, and redundant description will be omitted.

First Embodiment

Hereinafter, a first embodiment of the present disclosure will be described with reference to FIGS. 1 to 8.

Overall Configuration of Information Processing System 10

FIG. 1 is an overall configuration diagram of an information processing system 10 according to the first embodiment of the present disclosure. The information processing system 10 is provided to provide an "input support service" for assisting a user in performing a writing input. This information processing system 10 specifically includes one or a plurality of user devices 12 (corresponding to an "information processing apparatus"), one or a plurality of electronic pens 14, and a server device 16. Each user device 12 and the server device 16 are configured to be capable of two-way communication therebetween via a network NT.

The user device 12 is a computer owned by a user of the input support service, and has a function of detecting a position indicated by the electronic pen 14. The user device 12 is formed by, for example, a tablet computer, a smart phone, a personal computer, or the like.

The electronic pen 14 is a pen-type pointing device, and is configured to be capable of one-way or two-way communication with the user device 12. The electronic pen 14 is, for example, a stylus of an active capacitance type (AES) or an electromagnetic induction type (EMR). The user is able to draw pictures, characters, etc., on the user device 12 by holding the electronic pen 14 and moving the electronic pen 14 with a pen point thereof put onto a touch surface of the user device 12.

The server device 16 is a computer that performs centralized control related to the support in writing input, and may be either of a cloud type or an on-premises type. Here, the server device 16 is depicted as a single computer in the figure, but the server device 16 may alternatively be implemented as a group of computers that form a distributed system. The server device 16 specifically includes a server-side communication section 20, a server-side control section 22, and a server-side storage section 24.

The server-side communication section 20 is an interface for transmitting and receiving electrical signals to and from an external device. The server device 16 is thus capable of acquiring a digital ink from the user device 12, and of supplying learning parameter groups generated by the server device 16 to the user device 12.

The server-side control section 22 is formed by a processor including a central processing unit (CPU) or a graphics processing unit (GPU). The server-side control section 22 functions as a data processing section 26, a learning process section 28, and an output process section 30 by reading and executing a program and data stored in the server-side storage section 24.

The data processing section 26 processes a digital ink 74 (see FIG. 2) generated by the user device 12 to generate learning data 42, which will be described below. An operation of the data processing section 26 will be described in detail below.

The learning process section 28 performs a learning process on each of a discriminator 32 and an estimator 34, using the learning data 42 generated by the data processing section 26. An operation of the learning process section 28 will be described in detail below with reference to a flowchart of FIG. 4.

The output process section 30 outputs, toward the user device 12, a first parameter group 44 and a second parameter group 46 (see FIG. 2) obtained as a result of the learning process performed by the learning process section 28. As a result, the user device 12 is able to use the discriminator 32 through the first parameter group 44, and the estimator 34 through the second parameter group 46.

The server-side storage section 24 stores a program and data required for the server-side control section 22 to control constituent elements. The server-side storage section 24 is formed by a non-transitory computer-readable storage medium. Here, examples of such a computer-readable storage medium include 1) storage devices, such as a hard disk drive (HDD) and a solid-state drive (SSD), contained in a computer system, and 2) portable media, such as a magneto-optical disk, a read-only memory (ROM), a compact disc ROM (CD-ROM), and a flash memory.

In the server-side storage section 24, a database (hereinafter referred to as an ink DB 40) related to the digital inks 74 is constructed, and the learning data 42, the first parameter group 44, and the second parameter group 46 (corresponding to "learning information") are stored.

The learning data 42 is a collection of pieces of data used in machine learning performed by the learning process section 28. The learning data 42 includes 1) first training data used in learning of the discriminator 32, and 2) second training data used in learning of the estimator 34. The first training data includes a data pair representing a correspondence between "stroke feature amounts" including feature amounts (e.g., coordinate values, a pen pressure value, a slant angle, etc.) related to a stroke and an "identification label" of an object. The second training data includes a data pair representing a correspondence between a "feature amount set," which is a collection of feature amounts (e.g., the stroke feature amounts, the identification labels, etc.) related to a plurality of objects, and an "adjustment amount" for adjusting the position, posture, and/or the like of an object.

Note that the first and second training data may also include various feature amounts other than the stroke feature amounts, such as 1) "conditions set in a device driver," examples of which include identification information (e.g., a pen identification (ID)) and type of an input device, the type of the user device 12, and the shape of a pen pressure curve, and 2) "conditions set in a drawing application," examples of which include the type of content, color information of a color palette and a brush, and setting of visual effects.

The first parameter group 44 is a collection of learning parameters for identifying an algorithm of the discriminator 32, and corresponds to learning information representing a result of learning related to discrimination of an object. The second parameter group 46 is a collection of learning parameters capable of identifying an algorithm of the estimator 34, and corresponds to learning information representing a result of learning on a spatial relation (e.g., a positional relation, a magnitude relation, etc.) between adjacent objects. The learning parameters may include, for example, a coefficient describing an activation function of a computation unit, a weighting coefficient corresponding to strength of synaptic junction, the number of computation units constituting each of layers, the number of intermediate layers, and so on.

The first parameter group 44 or the second parameter group 46 may be the same for all users, or may be customized on a user-by-user basis. In the latter case, it is desirable that the first parameter group 44 or the second parameter group 46 is stored in advance so as to be associated with identification information capable of identifying the user, and is read as appropriate using identification information included in the digital ink 74 (see FIG. 2). Examples of the identification information used here include a user account of the input support service, and various types of IDs related to the electronic pen 14 or the user device 12.

Configuration of User Device 12

Figure 2:
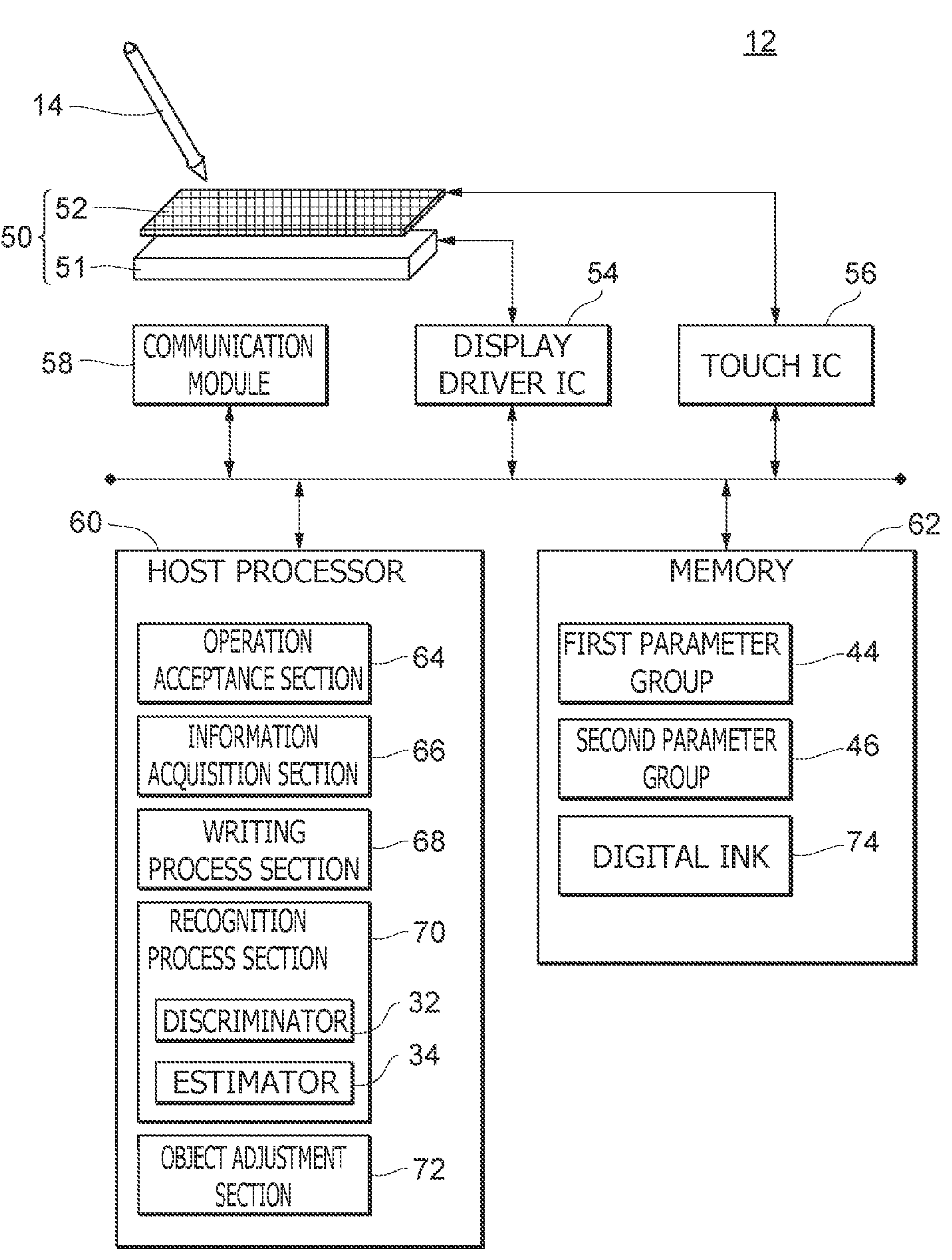
FIG. 2 is a block diagram illustrating an example of a configuration of a user device illustrated in FIG. 1.

FIG. 2 is a block diagram illustrating an example of a configuration of the user device 12 illustrated in FIG. 1. The user device 12 specifically includes a touchscreen display 50, a display driver integrated circuit (IC) 54, a touch IC 56, a communication module 58, a host processor 60 (corresponding to a "processor"), and a memory 62 (corresponding to a "storage medium").

The touchscreen display 50 includes a display panel 51 capable of displaying visible content, and a sheet-type touch sensor 52 disposed so as to overlap with the display panel 51 in a plan view. In the example of this figure, the touch sensor 52 is an "external" sensor attached to the display panel 51 from the outside, but a "built-in" sensor integrated with the display panel 51 may alternatively be used.

The display panel 51 is capable of displaying a black-and-white image or a color image, and may be formed by, for example, a liquid crystal panel, an organic electro-luminescence (EL) panel, or an electronic paper. Note that, when the display panel 51 is flexible, the user is able to perform various writing operations with the touch surface of the user device 12 being curved or bent.

The touch sensor 52 is a capacitive sensor having a plurality of sensor electrodes disposed in a planar arrangement. The touch sensor 52 includes, for example, a plurality of X-line electrodes for sensing positions along an X-axis of a sensor coordinate system, and a plurality of Y-line electrodes for sensing positions along a Y-axis thereof. Note that the touch sensor 52 may alternatively be a self-capacitance sensor having block-type electrodes disposed in a two-dimensional grid pattern instead of a mutual capacitance sensor as described above.

The display driver IC 54 is an integrated circuit that is electrically connected to the display panel 51, and which performs drive control on the display panel 51. The display driver IC 54 drives the display panel 51 on the basis of display signals supplied from the host processor 60. Content represented by the digital ink 74 is thus displayed on the display panel 51.

The touch IC 56 is an integrated circuit that is electrically connected to the touch sensor 52, and which performs drive control on the touch sensor 52. The touch IC 56 drives the touch sensor 52 on the basis of control signals supplied from the host processor 60. The touch IC 56 thus implements a "pen detection function" of detecting the state of the electronic pen 14, and a "touch detection function" of detecting a touch made by a finger of the user or the like. Thus, a graphical user interface (GUI) is constructed by combining an input function implemented by the touch sensor 52 and an output function implemented by the display panel 51.

The communication module 58 has a communication function of performing wired communication or wireless communication with an external device. This enables the user device 12 to transmit the digital ink 74 to the server device 16, and to receive the first parameter group 44 and the second parameter group 46 from the server device 16.

The host processor 60 is formed by a processing device including a CPU, a GPU, or a micro-processing unit (MPU). The host processor 60 functions as an operation acceptance section 64, an information acquisition section 66, a writing process section 68, a recognition process section 70, and an object adjustment section 72 by reading and executing a program and data stored in the memory 62.

The operation acceptance section 64 accepts an operation performed by the user via an input device (e.g., the electronic pen 14) used for writing input. Through such an operation, various setting functions can be performed, examples of the various setting functions including 1) writing setting functions concerning the color, thickness, decoration, etc., of strokes, and 2) adjustment setting functions concerning an operation of adjusting an object. Examples of "adjustment setting" include turning on and off of an adjustment function, and selection of an execution timing.

The information acquisition section 66 acquires information (hereinafter referred to as "learning information") representing a result of learning on a spatial relation between adjacent objects. The information acquisition section 66 may acquire the learning information either by reading the learning information stored in the memory 62 or by downloading the learning information from an external device, e.g., the server device 16. In addition, the information acquisition section 66 may acquire learning information corresponding to the identification information (i.e., the pen ID) of the electronic pen 14.

The writing process section 68 performs information processing (hereinafter referred to as a writing process) related to writing according to various operations performed by the user. Through such writing processes, various drawing functions are performed, examples of the various drawing functions including 1) a process of converting a stroke to data, 2) a process of displaying a stroke, and 3) a process of generating the digital ink 74.

The recognition process section 70 performs a recognition process on stroke data representing a collection of strokes to recognize a first object and a second object that has been inputted via a writing input after the first object. Here, examples of the "objects" include object elements such as, for example, characters, figures, symbols, and patterns, and also include object elements written halfway on the assumption that the object elements have been properly recognized. Examples of types of the characters include kanji, hiragana, katakana, Arabic numerals, and alphabets. Note that the first object may be made up of either a single object element or two or more object elements arranged together.

In addition, the recognition process section 70 includes a discriminator 32 and an estimator 34 each formed by a learner (e.g., a neural network) subjected to machine learning. The discriminator 32 is a learner for discriminating an object represented by one or a plurality of strokes. The estimator 34 is a learner for estimating the deviation amount of the second object from the positional relation between the objects. The "deviation amount" refers to the amount of deviation with respect to an ideal position or size.

The object adjustment section 72 performs an adjustment process on the stroke data, using a result of recognition by the recognition process section 70. This adjustment process may be a process of adjusting the position or size of the second object with the first object being fixed, and may be, for example, an affine transformation process. Examples of the position include the position in at least one of a row direction, a heightwise direction, and a rotation direction. Examples of the size include the dimension in the row direction or the heightwise direction, and the rate of magnification/reduction.

In addition, the object adjustment section 72 may execute the adjustment process when an execution condition is satisfied, and omit the adjustment process when the execution condition is not satisfied. Examples of the execution condition include 1) a condition that the setting of the adjustment function is "ON," 2) a condition that the first and second objects have been recognized simultaneously, 3) a condition that the deviation amount of the second object with respect to the first object exceeds a threshold value, and 4) a condition that at least one of the above three conditions is satisfied.

Further, the object adjustment section 72 may execute the adjustment process, selecting one type of execution timing from among a plurality of types of execution timings. Examples of the execution timings include 1) a time point at which an individual stroke operation related to the second object has been finished, 2) a time point at which, before the writing input of the second object is completed, the type of the object has been identified, and 3) a time point at which the writing input of the second object has been completed.

As is the case with the server-side storage section 24 (see FIG. 1), the memory 62 is formed by a non-transitory computer-readable storage medium. In the example of the present figure, the above-described first and second parameter groups 44 and 46 and, in addition, the digital ink 74 are stored in the memory 62.

The digital ink 74 is ink data for representing handwritten content. Examples of the data format, i.e., what is generally called "ink markup language," of the digital ink 74 include Wacom Ink Layer Language (WILL), Ink Markup Language (InkML), and Ink Serialized Format (ISF). The digital ink 74 has a data structure in which 1) document metadata (document metadata), 2) semantic data (ink semantics), 3) device data (devices), 4) stroke data (strokes), 5) grouping data (groups), and 6) context data (contexts) are arranged in order.

The stroke data is data for describing an individual stroke constituting content. Each stroke is described by a plurality of pieces of point data sequentially arranged in <trace>tags. The plurality of pieces of point data represent a starting point, a plurality of intermediate points, and an ending point, respectively, of the stroke. The pieces of point data are each made up of at least an indicated position (X-coordinate, Y-coordinate), and are separated by a delimiter, such as a comma. The pieces of point data may include, in addition to the aforementioned indicated positions, an order of writing, a pen pressure and/or a posture of the electronic pen 14, and/or the like.

Operation of Information Processing System 10

The information processing system 10 according to the first embodiment has the above-described configuration. Next, an operation of the information processing system 10 will be described below with reference mainly to FIGS. 3 to 8.

1. Generation of Digital Ink 74

First, an operation of generating the digital ink 74, which is performed by the user device 12 illustrated in FIG. 1, will be described below with reference to FIGS. 1 and 2.

The user, using the electronic pen 14 owned by the user, performs a writing input on the user device 12. The writing process section 68 (see FIG. 2) of the user device 12 performs the writing process according to the writing operation performed by the user, thereby generating the stroke data. Then, when an operation for saving the data has been accepted by the operation acceptance section 64 (see FIG. 2), the host processor 60 generates the digital ink 74, including the stroke data, and causes the generated digital ink 74 to be stored in the memory 62.

Thereafter, the user device 12 transmits the digital ink 74 generated in the user device 12 itself to the server device 16. Then, the server-side control section 22 causes the digital ink 74, received via the server-side communication section 20, to be stored in the server-side storage section 24. The new digital ink 74 is thus added to and registered in the ink DB 40.

2. Generation of Learning Data 42

Next, an operation of generating the learning data 42, which is performed by the server device 16 illustrated in FIG. 1, will be described below with reference to FIG. 1. The data processing section 26 of the server device 16 refers to the ink DB 40 to acquire the digital ink 74 (see FIG. 2) to be analyzed. Then, the data processing section 26 performs data processing on the acquired digital ink 74 to generate the first training data and the second training data to be used in machine learning. The server-side control section 22 causes the first training data and the second training data generated therein to be stored in the server-side storage section 24. The learning data 42 is thus made available.

Figure 3:
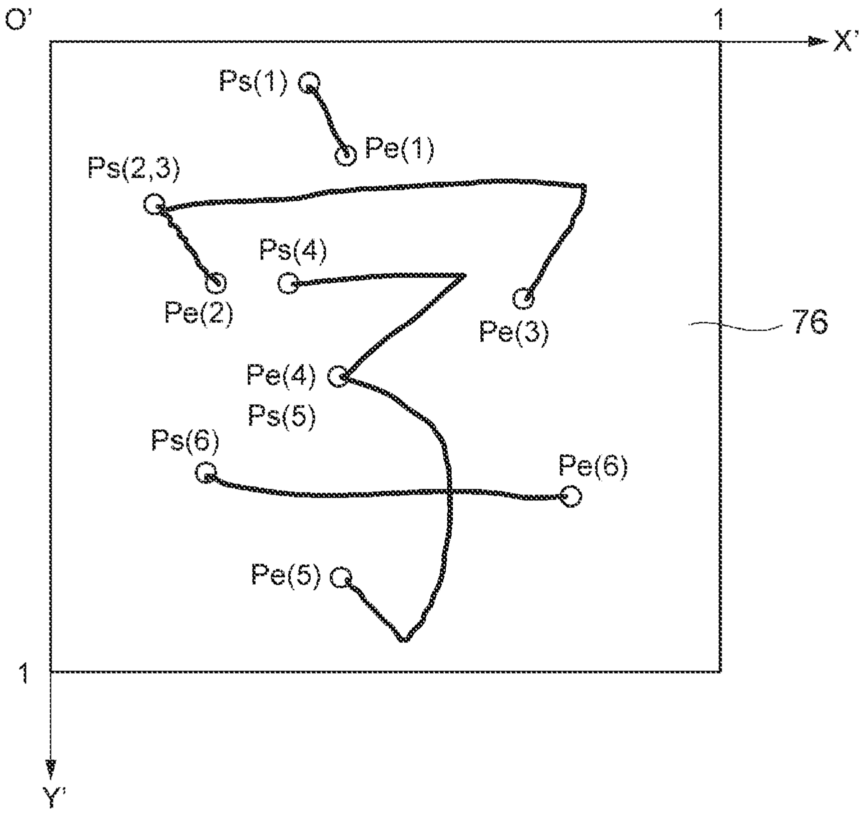
FIG. 3 is a diagram illustrating an example of a method for generating a feature amount set of each of bounding boxes.

FIG. 3 is a diagram illustrating an example of a method for generating a feature amount set of each of bounding boxes 76. The data processing section 26 defines a two-dimensional coordinate system (hereinafter referred to as a normalized coordinate system; X'-Y') corresponding to the touch surface of the user device 12. An origin O' of this normalized coordinate system corresponds to a vertex of the bounding box 76 that is located closest to an origin O of the sensor coordinate system. An X'-axis of the normalized coordinate system is parallel to the X-axis of the sensor coordinate system, while a Y'-axis of the normalized coordinate system is parallel to the Y-axis of the sensor coordinate system. In addition, the scales of the X'-axis and the Y'-axis are normalized such that coordinates of four vertices defining the bounding box 76 will be (0, 0), (1, 0), (0, 1), and (1, 1).

The data processing section 26 refers to stroke data representing at least one stroke (six strokes in the example of the present figure), and acquires coordinate values (X, Y) of a starting point Ps of each stroke and coordinate values (X, Y) of an ending point Pe of the stroke in the sensor coordinate system. Then, the data processing section 26 derives coordinate values (X', Y') of the starting point Ps of the stroke and coordinate values (X', Y') of the ending point Pe of the stroke in the normalized coordinate system by performing linear transformation of the coordinate system. Note that, in a case where the starting point Ps or the ending point Pe of the stroke is outside of the bounding box 76, the data processing section 26 may generate locus feature amounts, regarding an intermediate point thereof on a boundary line as a virtual starting point Ps or ending point Pe thereof.

3. Learning of Discriminator 32 or Estimator 34

Next, an operation in which the server device 16 illustrated in FIG. 1 performs learning on the discriminator 32 and the estimator 34 will be described below with reference to the flowchart of FIG. 4 and FIGS. 5 and 6.

Figure 4:
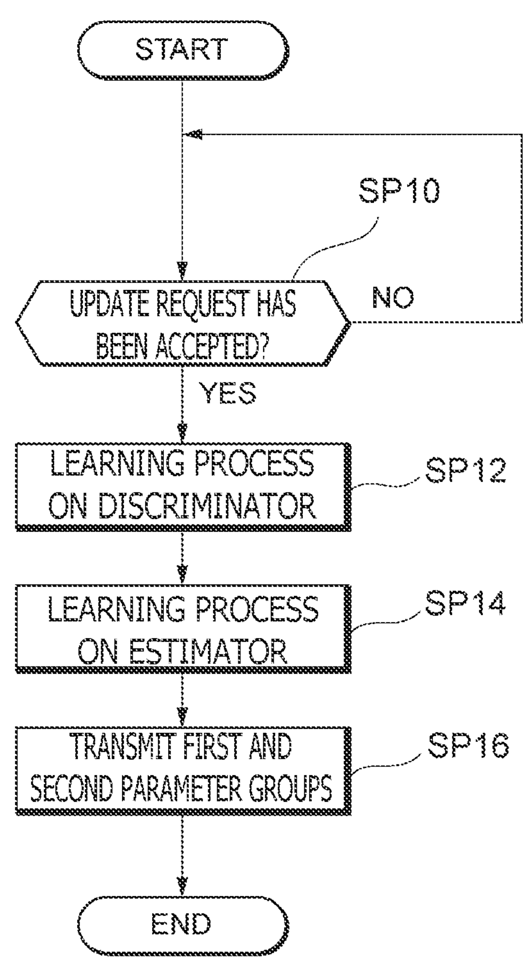
FIG. 4 is a flowchart illustrating an example operation in which a server device illustrated in FIG. 1 performs learning on a discriminator and an estimator.

At SP10 in FIG. 4, the server-side control section 22 (see FIG. 1) of the server device 16 checks whether or not an update request from a particular user has been accepted. If the update request has not been accepted yet (SP10: NO), control stays at SP10 until this request is accepted. Meanwhile, if the update request has been accepted (SP10: YES), control proceeds to the next SP12.

At SP12, the learning process section 28 of the server device 16 performs a learning process on the discriminator 32, using the learning data 42 (more specifically, the first training data) already generated. This learning process is performed employing any of various methods that are commonly applied to machine learning. Through this learning process, a first parameter group 44 common to a plurality of users, or a first parameter group 44 customized on a user-by-user basis, is calculated. Note that, in a case where the discriminator 32 or the estimator 34 is customized on a user-by-user basis, the learning process section 28 selectively acquires learning data 42 corresponding to identification information (e.g., a pen ID) that identifies the user.

Figure 5:
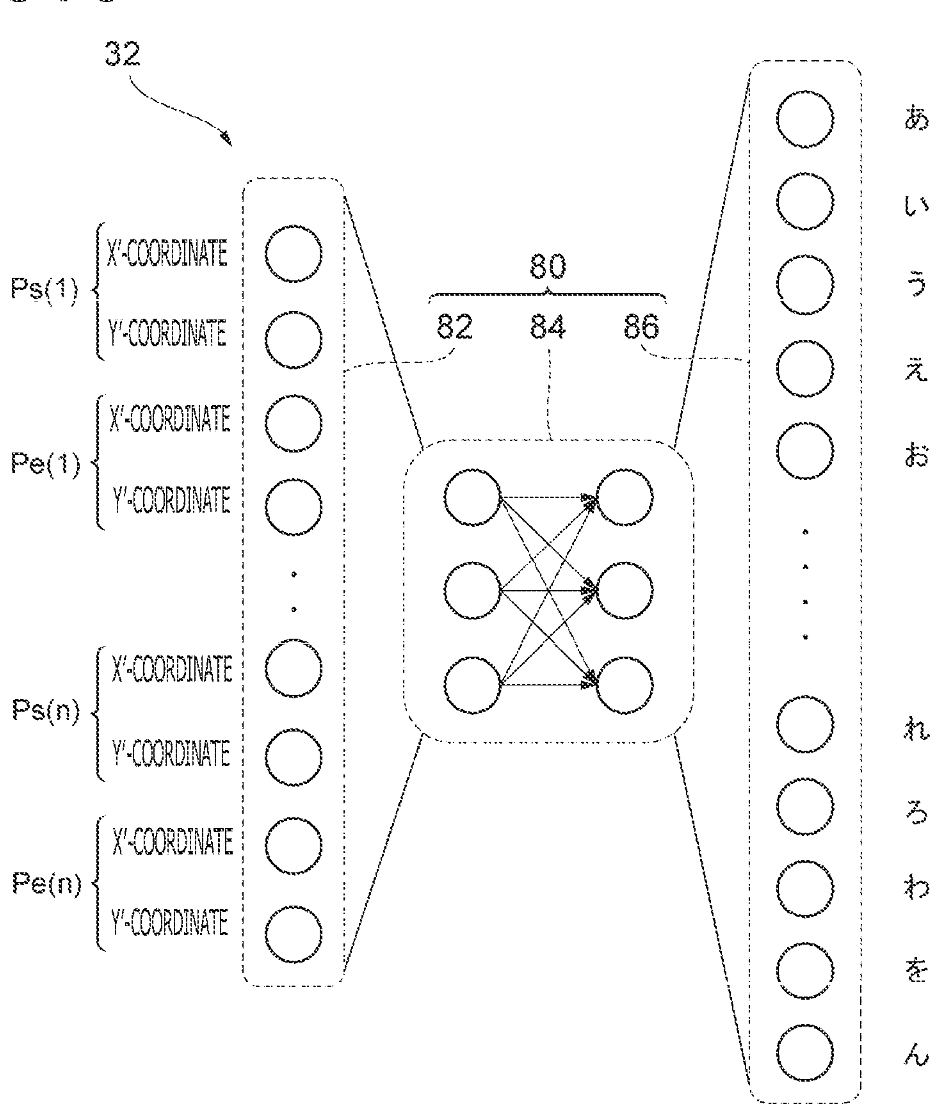
FIG. 5 is a diagram illustrating an example network structure of the discriminator.

FIG. 5 is a diagram illustrating an example network structure of the discriminator 32. The discriminator 32 is formed by, for example, a hierarchical neural network 80, and includes an input layer 82, an intermediate layer 84, and an output layer 86. The algorithm of the discriminator 32 is determined by values of the first parameter group 44 (see FIG. 1), which is a collection of learning parameters.

The input layer 82 is a layer at which a feature amount set (see FIG. 3) representing n strokes is inputted, and is made up of a plurality of (for example, 2n) computation units.

The intermediate layer 84 includes one or more layers, and has a dimensionality reduction function of reducing the dimensionality of an input vector. Therefore, it is desirable that the number of computation units that constitute the intermediate layer 84 is smaller than 2n.

The output layer 86 is a layer at which a label group of characters is outputted, and, in the example of the present figure, includes computation units the number of which is equal to the number (for example, 46, excluding sonant and plosive marks) of hiragana characters. In a case where an activation function of each computation unit is a softmax function, this label group is an output vector having 46 components each representing the probability of a separate one of the characters.

Here, in a case where the type of characters is “kanji,” a discriminator 32 suited to kanji discrimination, which is different from the discriminator 32 dedicated to “hiragana,” may alternatively be selected. Alternatively, in a case where the type of characters cannot be identified, a discriminator 32 suited to discrimination of a plurality of types of characters (for example, hiragana and katakana) may be selected.

At SP14 in FIG. 4, the learning process section 28 performs a learning process on the estimator 34, using the learning data 42 (more specifically, the second training data), which has been acquired at SP10. This learning process is performed by employing any of various methods that are commonly applied to machine learning. Through this learning process, a second parameter group 46 customized on a user-by-user basis is calculated.

Figure 6:
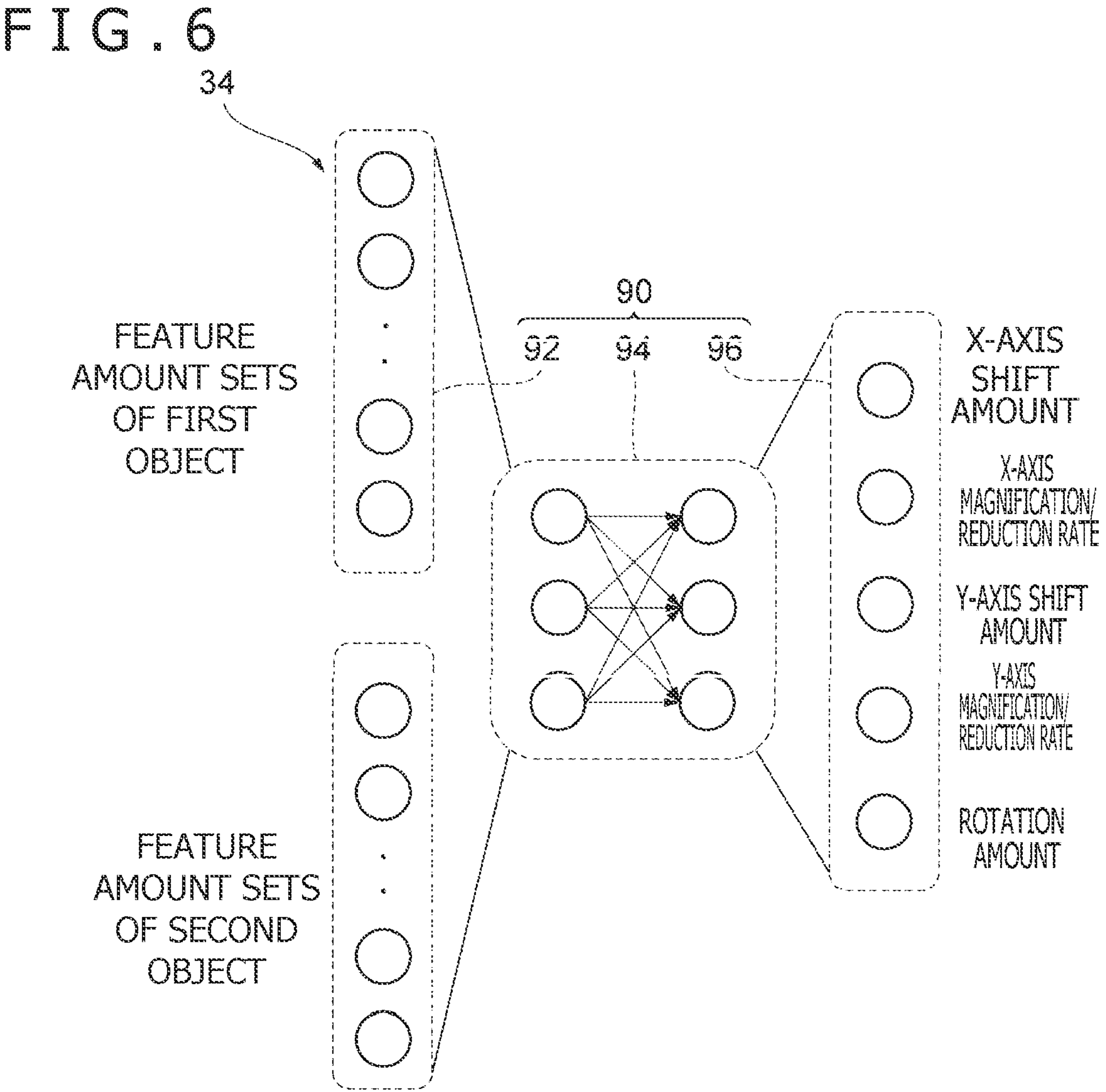
FIG. 6 is a diagram illustrating an example network structure of the estimator.

FIG. 6 is a diagram illustrating an example network structure of the estimator 34. The estimator 34 is formed by, for example, a hierarchical neural network 90, and includes an input layer 92, an intermediate layer 94, and an output layer 96. The algorithm of the estimator 34 is determined by values of the second parameter group 46 (see FIG. 1), which is a collection of learning parameters.

The input layer 92 is a layer at which feature amount sets (the number of which is M) concerning each of the first object and the second object are inputted, and includes a plurality of (for example, 2M) computation units.

The intermediate layer 94 includes one or more layers, and has the dimensionality reduction function of reducing the dimensionality of an input vector. Therefore, it is desirable that the number of computation units that constitute the intermediate layer 94 is smaller than 2M.

The output layer 96 is a layer at which the deviation amount of the second object is outputted, and, in the example of the present figure, is made up of five computation units. Specifically, 1) the amount of shift in the X-axis direction, 2) the rate of magnification/reduction in the X-axis direction, 3) the amount of shift in the Y-axis direction, 4) the rate of magnification/reduction in the Y-axis direction, and 5) the amount of rotation in a 0 direction are outputted.

At SP16 in FIG. 4, the server-side communication section 20 of the server device 16 transmits the first parameter group 44 and the second parameter group 46 calculated through the learning processes at SP12 and SP14, respectively, toward the user device 12 that has made the update request. The user device 12 stores the received first parameter group 44 in the memory 62 to enable construction of the discriminator 32 in a device environment of the user device 12 itself. The user device 12 stores the received second parameter group 46 in the memory 62 to enable construction of the estimator 34 in the device environment of the user device 12 itself. The server device 16 thus finishes the procedure of the flowchart illustrated in FIG. 4.

4. Automatic Adjustment of Object

Next, an operation of the user device 12, which forms a portion of the information processing system 10, more specifically, an operation of adjusting an object, will be described below with reference to a flowchart of FIG. 7 and FIG. 8.

Figure 7:
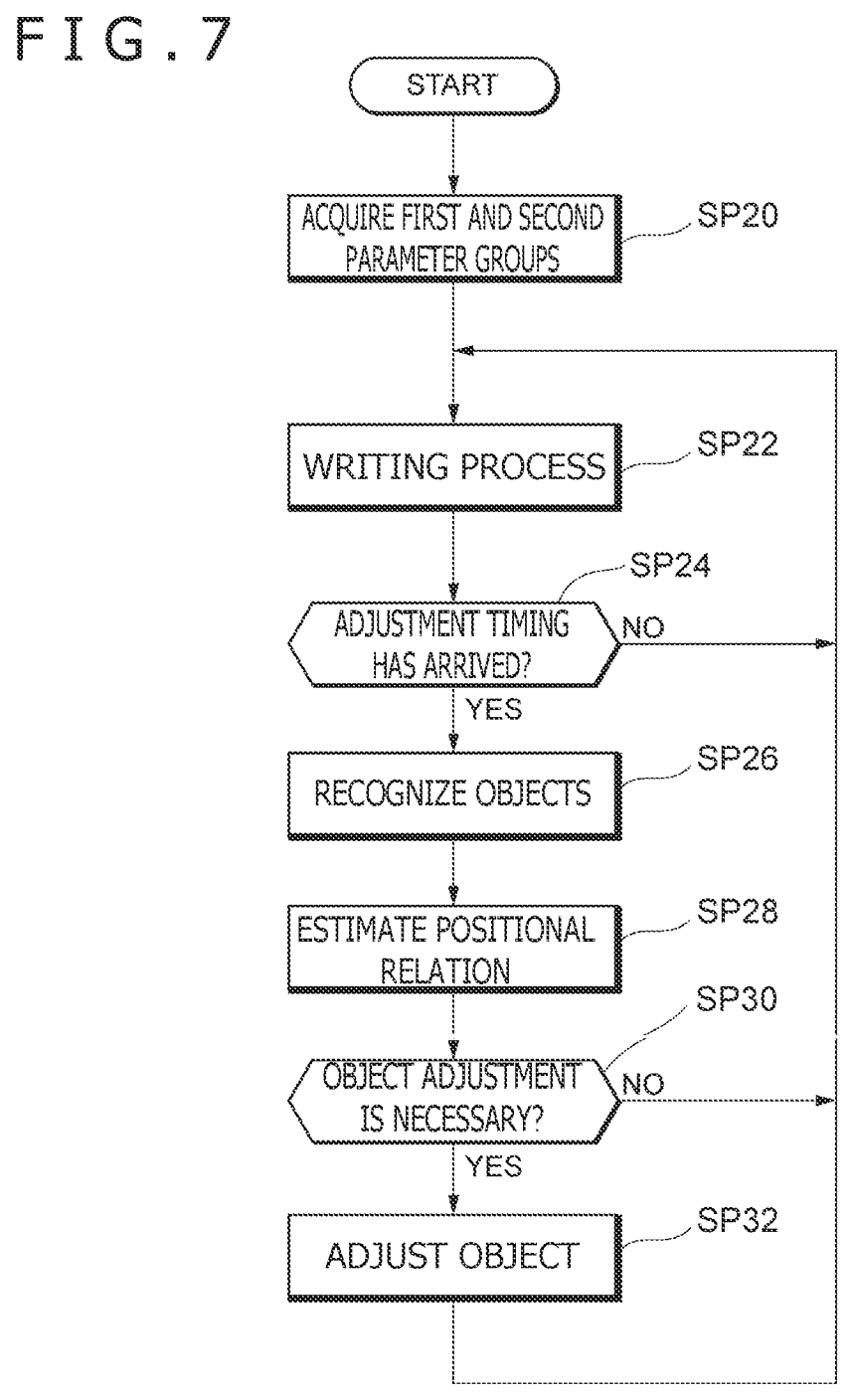

At SP20 in FIG. 7, the information acquisition section 66 acquires the first parameter group 44 and the second parameter group 46 from the memory 62. This enables the recognition process section 70 to function as the discriminator 32 and the estimator 34.

At SP22, the writing process section 68 performs the writing process according to various operations performed by the user.

At SP24, the host processor 60 checks whether or not an adjustment timing for an object has arrived. It is assumed here that "the time point at which a writing input of each of objects has been completed" is set as the adjustment timing.

If an adjustment timing for an object has not arrived yet (SP24: NO), SP22 and SP24 are repeated one after the other until arrival of an adjustment timing. Meanwhile, if an adjustment timing has arrived (SP24: YES), control proceeds to the next SP26.

At SP26, the recognition process section 70 recognizes one or a plurality of objects, using stroke data generated latest at the time of SP24. This recognition process is performed through the learned discriminator 32. As a result, the first and second objects that have been written latest one after the other are recognized.

At SP28, the recognition process section 70 estimates the positional relation between the first object and the second object recognized at SP26. This estimation process is performed through the learned estimator 34. As a result, the deviation amounts of the second object with respect to the first object are obtained.

At SP30, the object adjustment section 72 checks whether or not the second object needs to be adjusted, referring to a result of the estimation at SP28. If the adjustment is not necessary (SP30: NO), control returns to SP22 without the object adjustment section 72 adjusting the second object. Meanwhile, if the adjustment is necessary (SP30: YES), control proceeds to the next SP32.

At SP32, the object adjustment section 72 makes an adjustment on the basis of the positional relation estimated at SP28 such that the deviation amounts, in terms of position or size, of the second object with respect to the first object will be reduced.

Figure 8:
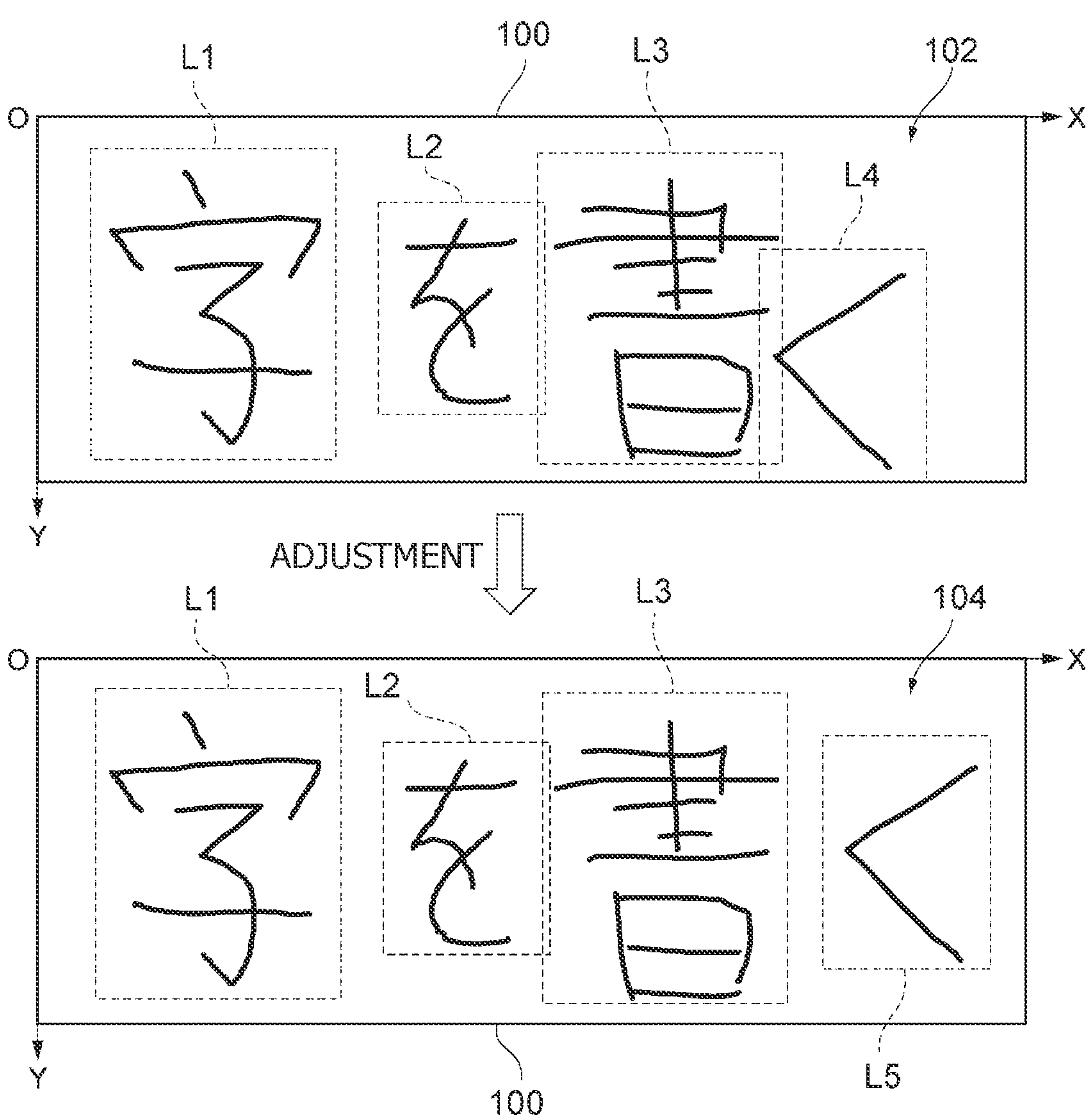
FIG. 8 is a diagram illustrating an example result of adjusting an object.

FIG. 8 is a diagram illustrating an example result of adjusting an object. An upper portion of the figure illustrates hand-written content before an adjustment process for the object is executed, while a lower portion of the figure illustrates the hand-written content after the adjustment process for the object is executed. In a whole region 100 of the sensor coordinate system, a stroke group 102 representing the hand-written content is arranged. The stroke group 102 represents a character string made up of kanji and hiragana characters. The character string is made up of four characters L1, L2, L3, and L4 arranged in this order from the left side.

It is assumed, for example, that the character L4 has been written at a position closer to that of the character L3 than is normal. In this case, at a time point at which the writing input of the character L4 has been completed, an adjustment process for the character L3 and the character L4 as the "first object" and the "second object," respectively, is started. Then, the position of the character L4 as a whole is shifted upward to the right, resulting in a new character L5. In other words, in the whole region 100 of the sensor coordinate system, the stroke group 102 is automatically updated to a stroke group 104. As a result, a proper positional relation between the two characters L3 and L5 is achieved with the characters L1 to L3 being fixed.

Thereafter, returning to SP22 in FIG. 7, the host processor 60 repeats SP22 to SP32 while the user is performing a writing operation, and adjusts an object when necessary. The processes in the flowchart illustrated in FIG. 7 are sequentially performed in the above-described manner.

Effects Achieved by Information Processing System 10

As described above, the user device 12, which is an information processing apparatus according to the first embodiment, includes the information acquisition section 66, which acquires the learning information (here, the second parameter group 46) representing a result of learning on the spatial relation between adjacent objects, the recognition process section 70, which performs the recognition process on stroke data representing a collection of strokes to recognize a first object and a second object that has been inputted via a writing input after the first object, and the object adjustment section 72, which performs the adjustment process on the stroke data on the basis of the second parameter group 46 acquired by the information acquisition section 66 such that the position or size of the second object is adjusted with the first object recognized by the recognition process section 70 being fixed.

According to an information processing program and method according to the first embodiment, one or a plurality of computers (here, the user device 12) perform acts of acquiring the second parameter group 46 representing a result of learning on the spatial relation between adjacent objects (SP20 in FIG. 7), performing the recognition process on stroke data representing a collection of strokes to recognize a first object and a second object that has been inputted via a writing input after the first object (SP26), and performing the adjustment process on the stroke data on the basis of the acquired second parameter group 46 such that the position or size of the second object is adjusted with the recognized first object being fixed (SP32).

Adjusting the position or size of the second object on the basis of the acquired second parameter group 46 with the first object being fixed as described above makes it possible to automatically correct various types of information obtained through a writing operation at appropriate times.

In addition, the object adjustment section 72 may execute the adjustment process, selecting one type of execution timing from among a plurality of types of execution timings. This makes it possible to adjust the object at an appropriate timing selected in advance.

Further, the plurality of types of execution timings may include a time point at which the objects have been identified before the writing input of the second object is completed. This enables the adjustment to be performed before the writing input is completed, facilitating subsequent writing input.

Furthermore, the adjustment process may be a process of adjusting the position in at least one of the row direction, the heightwise direction, and the rotation direction. This enables smooth adjustment of deviation in the position or orientation of the object.

Second Embodiment

Next, a second embodiment of the present disclosure will be described below with reference to FIGS. 9 to 14. Note that members, sections, functions, etc., that have their equivalents in the first embodiment are denoted by the same reference characters as those of their equivalents in the first embodiment, and descriptions of such members, sections, functions, etc., may be omitted.

Overall Configuration of Information Processing System 110

Figure 9:
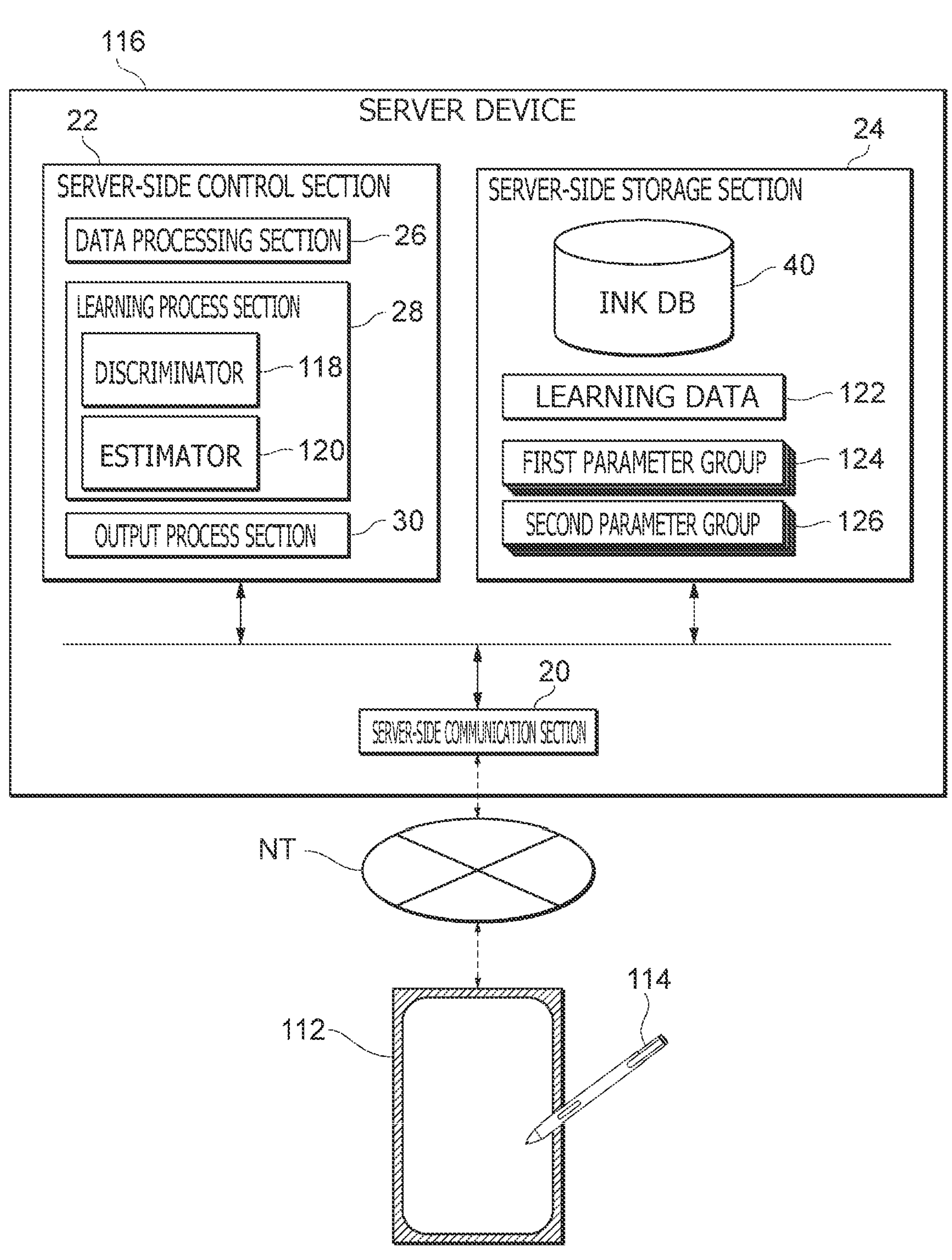
FIG. 9 is an overall configuration diagram of an information processing system according to a second embodiment of the present disclosure.

FIG. 9 is an overall configuration diagram of an information processing system 110 according to the second embodiment of the present disclosure. Similarly to the information processing system 10 according to the first embodiment illustrated in FIG. 1, the information processing system 110 is provided to provide an "input support service" for assisting a user in performing a writing input. This information processing system 110 specifically includes one or a plurality of user devices 112 (corresponding to the "information processing apparatus"), one or a plurality of electronic pens 114, and a server device 116. Each user device 112 and the server device 116 are configured to be capable of two-way communication therebetween via a network NT.

Similarly to the user device 12 according to the first embodiment illustrated in FIG. 1, the user device 112 is a computer owned by a user of the input support service, and has a function of detecting a position indicated by the electronic pen 114. Similarly to the electronic pen 14 according to the first embodiment illustrated in FIG. 1, the electronic pen 114 is a pen-type pointing device, and is configured to be capable of one-way or two-way communication with the user device 112.

Similarly to the server device 16 according to the first embodiment illustrated in FIG. 1, the server device 116 includes a server-side communication section 20, a server-side control section 22, and a server-side storage section 24. Note, however, that the server device 116 is different from the server device 16 illustrated in FIG. 1 in 1) the functions of a learning process section 28 of the server-side control section 22 and 2) data stored in the server-side storage section 24.

The learning process section 28 of the server-side control section 22 performs a learning process on each of a discriminator 118 and an estimator 120, using learning data 122 generated by a data processing section 26. An operation of the learning process section 28 will be described in detail below.

In the server-side storage section 24, an ink DB 40 is constructed, and the learning data 122, which is different in data definition from the learning data 42 according to the first embodiment, a first parameter group 124, and a second parameter group 126 (corresponding to the "learning information") are stored.

The learning data 122 is a collection of pieces of data used in machine learning performed by the learning process section 28. The learning data 122 includes 1) first training data used in learning of the discriminator 118, and 2) second training data used in learning of the estimator 120. The first training data is made up of a data pair representing a correspondence between "stroke feature amounts" including feature amounts (e.g., coordinate values, a pen pressure value, a slant angle, etc.) related to a stroke and an "identification label" of an object. The second training data is made up of a data pair representing a correspondence between "pre-adjustment stroke feature amounts" related to a stroke group before an adjustment and "font data" representing the style of a font, and "post-adjustment stroke feature amounts" related to a second stroke after the adjustment.

Structure of User Device 112

Figure 10:
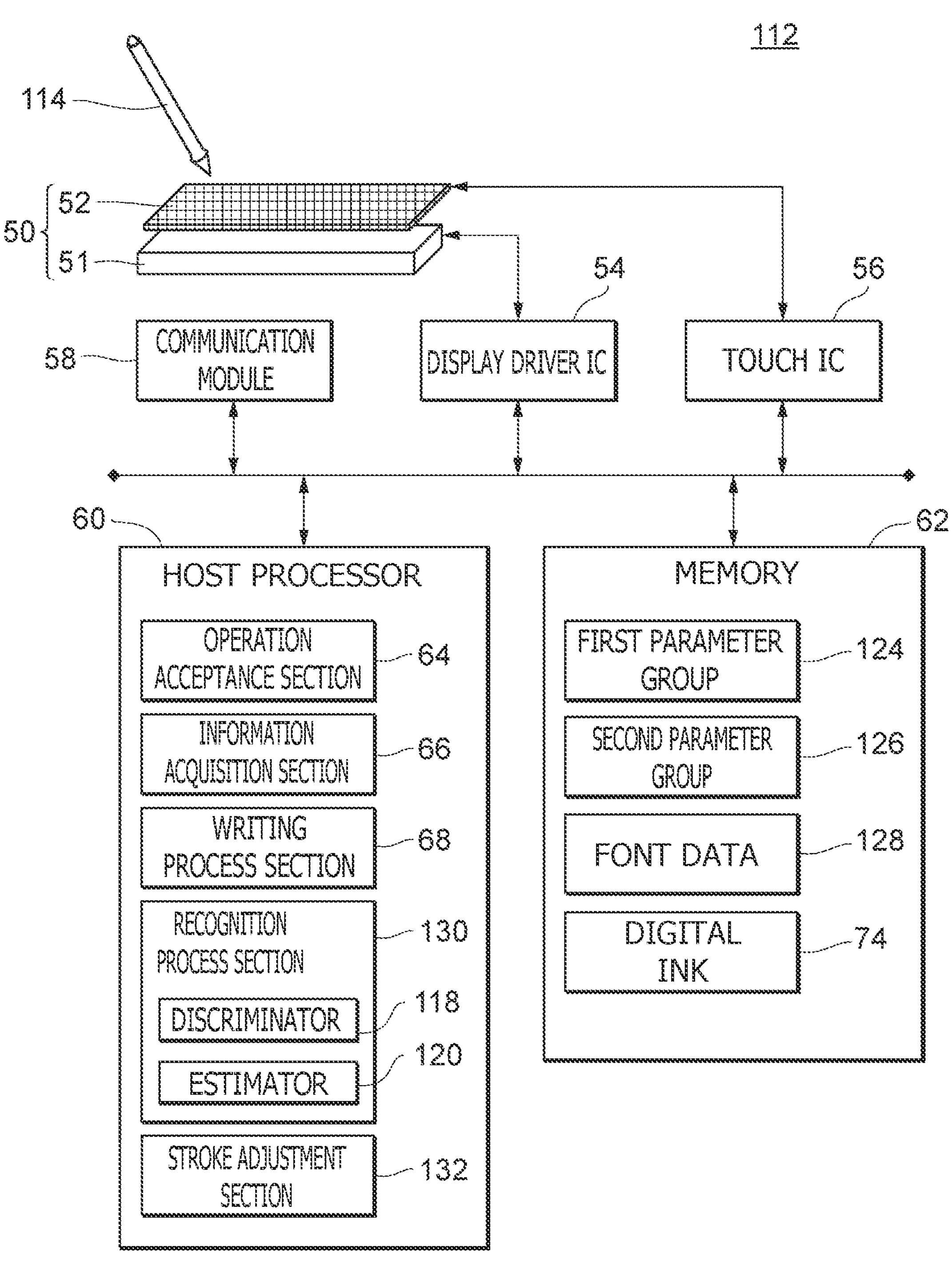
FIG. 10 is a block diagram illustrating an example of a configuration of a user device illustrated in FIG. 9.

FIG. 10 is a block diagram illustrating an example of a configuration of the user device 112 illustrated in FIG. 9. Similarly to the user device 12 according to the first embodiment illustrated in FIG. 2, the user device 112 includes a touchscreen display 50, a display driver IC 54, a touch IC 56, a communication module 58, a host processor 60, and a memory 62.

The host processor 60 is formed by a processing device including a CPU, a GPU, or an MPU. The host processor 60 functions as an operation acceptance section 64, an information acquisition section 66, a writing process section 68, a recognition process section 130, and a stroke adjustment section 132 by reading and executing a program and data stored in the memory 62.

The operation acceptance section 64 accepts an operation performed by the user via an input device (e.g., the electronic pen 114) used for writing input. Through such an operation, various setting functions can be performed, examples of the various setting functions including 1) writing setting functions concerning the color, thickness, decoration, etc., of strokes, and 2) adjustment setting functions concerning an operation of adjusting a stroke. Examples of "adjustment setting" include turning on and off of an adjustment function, and selection of an execution timing.

The information acquisition section 66 acquires information (hereinafter referred to as "learning information") representing a result of learning on a spatial or semantic relation between strokes constituting an object. The information acquisition section 66 may acquire the learning information either by reading the learning information stored in the memory 62 or by downloading the learning information from an external device, e.g., the server device 116. In addition, the information acquisition section 66 may acquire learning information associated with a user who performs an operation of writing strokes. The user and the learning information are associated with each other by use of, for example, a user account of the input support service, or any of various types of IDs related to the electronic pen 114 or the user device 112.

The writing process section 68 performs a writing process according to various operations performed by the user. Through such writing processes, various drawing functions are performed, examples of the various drawing functions including 1) a process of converting a stroke to data, 2) a process of displaying a stroke, and 3) a process of generating a digital ink 74.

The recognition process section 130 performs a recognition process on stroke data representing a collection of strokes to recognize a first stroke group and a second stroke inputted via a writing input after the first stroke group. The "first stroke group" may include only a single object element written halfway, or may include one or more object elements that have been written latest.

Here, the recognition process section 130 includes a discriminator 118 and an estimator 120 each formed by a learner (e.g., a neural network) subjected to machine learning. The discriminator 118 is a learner for discriminating an object represented by one or a plurality of strokes. The estimator 120 is a learner for estimating a proper shape of the second stroke from the positional relation between the strokes. The "proper shape" refers to not only the shape of the stroke as a whole but also a partial shape of the stroke.

The stroke adjustment section 132 performs an adjustment process on the stroke data, using a result of recognition by the recognition process section 130. This adjustment process is a process of adjusting the position or shape of the second stroke inputted via the writing input after the first stroke group with the first stroke group, made up of one or more strokes, being fixed. Examples of the position to be adjusted include the position in at least one of the row direction, the heightwise direction, and the rotation direction. Examples of the shape to be adjusted include coordinate values of a starting point, an ending point, and an intermediate point of a stroke, the length of a line segment, curvature, and the shape of an end portion of a stroke (e.g., a full stop at the end of a stroke, an upward turn at the end of a stroke, a sweeping end of a stroke, etc.).

In addition, the stroke adjustment section 132 may determine whether the adjustment process needs to be performed each time the writing input of the second stroke is finished, in a case where the setting of the adjustment function is "ON." Specifically, the stroke adjustment section 132 may execute the adjustment process when an execution condition is satisfied, and omit the adjustment process when the execution condition is not satisfied. Examples of the execution condition include 1) a condition that the type of an object including the second stroke has been recognized, 2) a condition that the amount of change (e.g., in position, shape, size, difference in length, etc.) of the second stroke to be caused by the adjustment exceeds a threshold value, and 3) a condition that at least one of the above two conditions is satisfied.

Similarly to the memory 62 according to the first embodiment (see FIG. 1), the memory 62 is formed by a non-transitory computer-readable storage medium. In the example of the present figure, the first parameter group 124, the second parameter group 126, font data 128, and the digital ink 74 are stored in the memory 62.

The font data 128 is data representing a standard style (i.e., a font) of characters as objects. The font data 128 may be, for example, any of 1) image data representing the font, 2) coordinate information representing feature points of the font, and 3) distributed representation vectors representing feature amounts of the characters. The font is provided for each of the characters that can be discriminated by the discriminator 118. The number of types of fonts may be either one or more than one.

Operation of Information Processing System 110

The information processing system 110 according to the second embodiment has the above-described configuration. Next, an operation of the information processing system 110 will be described below with reference mainly to FIGS. 11 to 14.

1. Generation of Digital Ink 74

An operation performed by the server device 116 illustrated in FIG. 9 to generate the digital ink 74 is basically similar to the corresponding operation of the first embodiment, and therefore, a description thereof is omitted.

2. Generation of Learning Data 122

An operation performed by the server device 116 illustrated in FIG. 9 to generate the learning data 122 is basically similar to the corresponding operation of the first embodiment, and therefore, a description thereof is omitted.

3. Learning of Discriminator 118 or Estimator 120

An operation in which the server device 116 illustrated in FIG. 9 performs learning on the discriminator 118 and the estimator 120 is basically similar to the corresponding operation of the first embodiment (see the flowchart of FIG. 4), and therefore, a description thereof is omitted.

Figure 11:
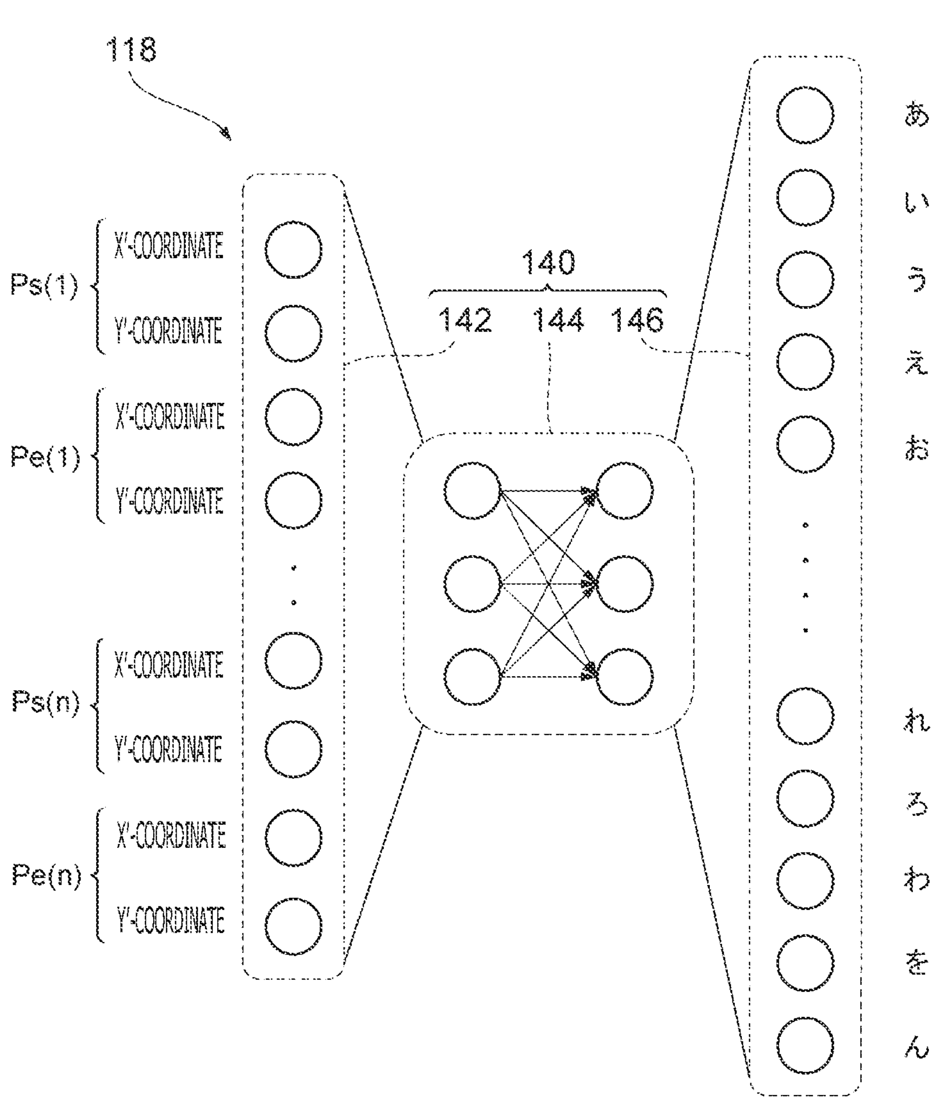
FIG. 11 is a diagram illustrating an example network structure of a discriminator.

FIG. 11 is a diagram illustrating an example network structure of the discriminator 118. The discriminator 118 is formed by, for example, a hierarchical neural network 140, and includes an input layer 142, an intermediate layer 144, and an output layer 146. An algorithm of the discriminator 118 is determined by values of the first parameter group 124 (see FIG. 9), which is a collection of learning parameters.

The input layer 142 is a layer at which a feature amount set (see FIG. 3) representing n strokes is inputted, and is made up of a plurality of (for example, 2n) computation units.

The intermediate layer 144 includes one or more layers, and has the dimensionality reduction function of reducing the dimensionality of an input vector. Therefore, it is desirable that the number of computation units that constitute the intermediate layer 144 is smaller than 2n.

The output layer 146 is a layer at which a label group of characters is outputted, and, in the example of the present figure, is made up of computation units the number of which is equal to the number (for example, 46, excluding sonant and plosive marks) of hiragana characters. In a case where an activation function of each computation unit is a softmax function, this label group is an output vector having 46 components each representing the probability of a separate one of the characters.

Figure 12:
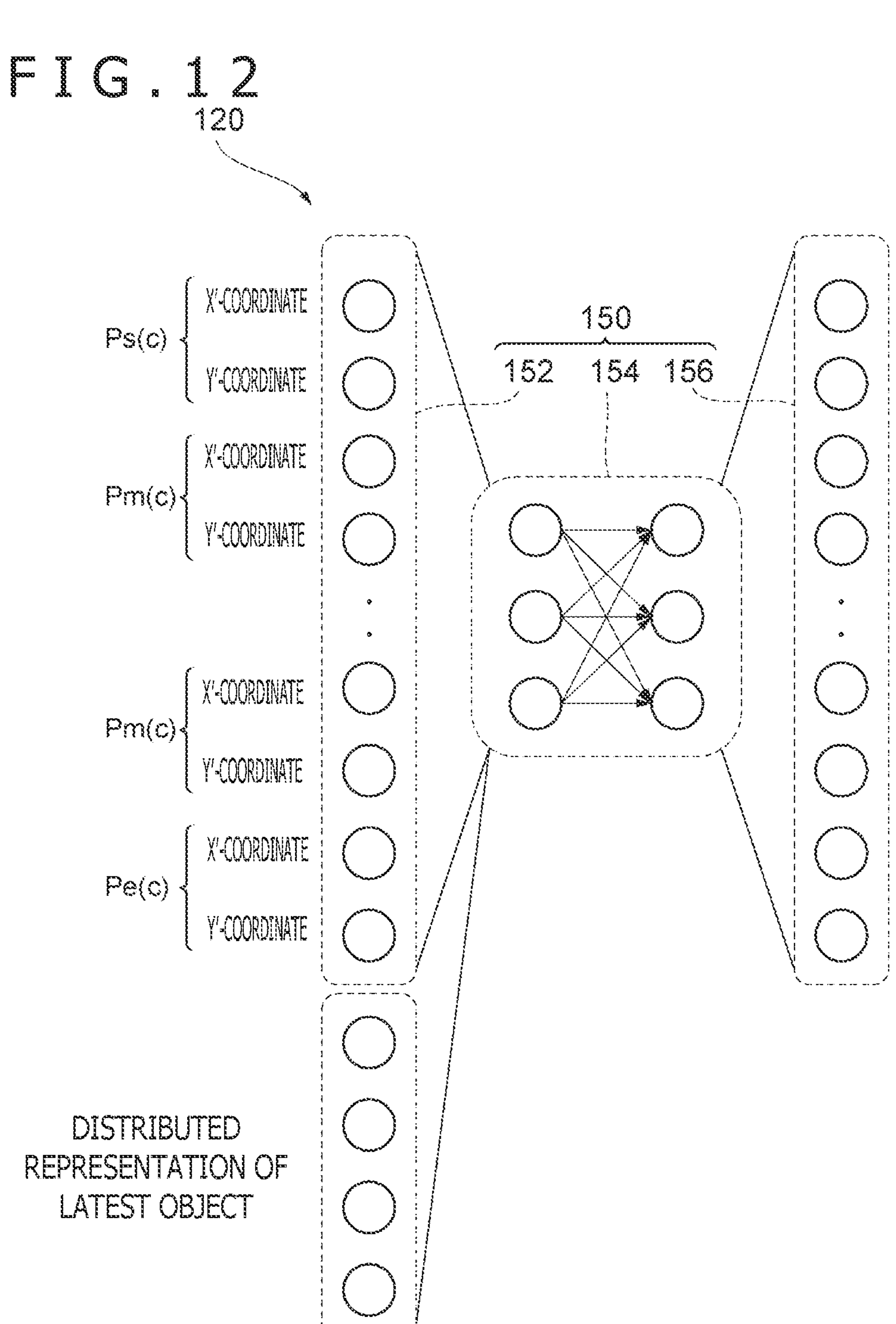
FIG. 12 is a diagram illustrating an example network structure of an estimator.

FIG. 12 is a diagram illustrating an example network structure of the estimator 120. The estimator 120 is formed by, for example, a hierarchical neural network 150, and includes an input layer 152, an intermediate layer 154, and an output layer 156. An algorithm of the estimator 120 is determined by values of the second parameter group 126 (see FIG. 9), which is a collection of learning parameters.

The input layer 152 is a layer at which a feature amount set made up of a combination of stroke feature amounts (the number of which is 2n) related to the first stroke group and pieces of font data (the number of which is f) is inputted, and is made up of (2n+f) computation units.

The intermediate layer 154 includes one or more layers, and has the dimensionality reduction function of reducing the dimensionality of an input vector. Therefore, it is desirable that the number of computation units that constitute the intermediate layer 154 is smaller than (2n+f).

The output layer 156 is a layer at which stroke feature amounts (the number of which is 2m) related to a second stroke that can be written next to the first stroke group are outputted, and, in the example of the present figure, is made up of 2m computation units.

4. Automatic Adjustment of Stroke

Next, an operation of the user device 112, which forms a portion of the information processing system 110, more specifically, an operation of adjusting a stroke, will be described below with reference to a flowchart of FIG. 13 and FIG. 14.

Figure 13:
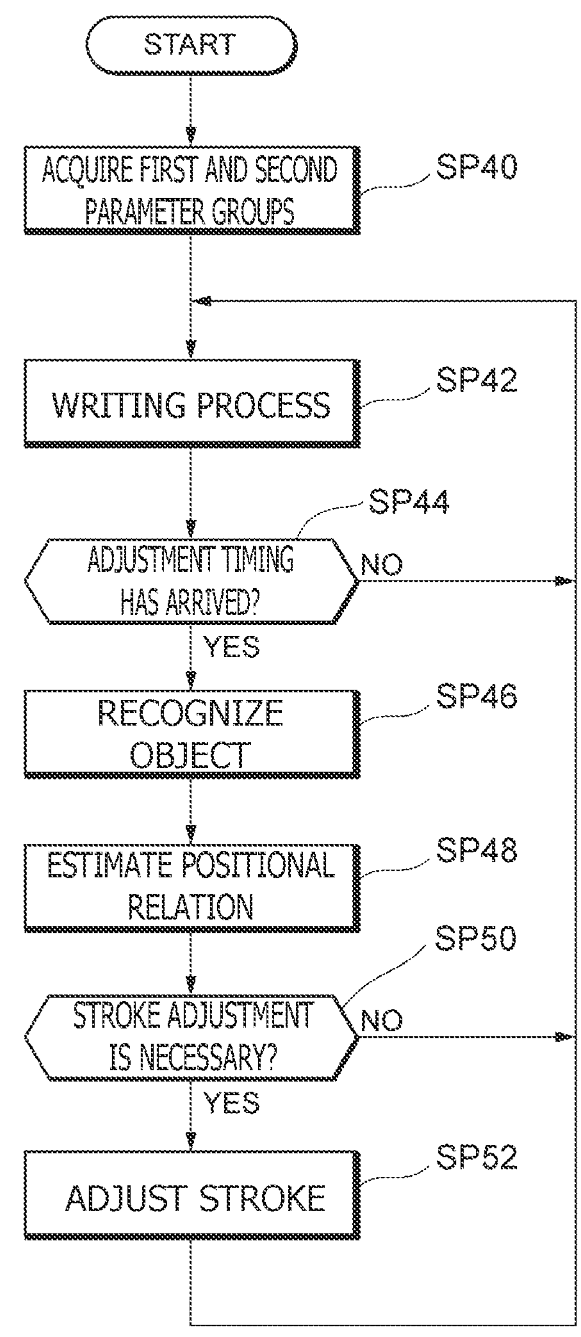
FIG. 13 is a flowchart illustrating an example operation in which the user device illustrated in FIGS. 9 and 10 adjusts a stroke.

At SP40 in FIG. 13, the information acquisition section 66 acquires the first parameter group 124 and the second parameter group 126 from the memory 62. This enables the recognition process section 130 to function as the discriminator 118 and the estimator 120.

At SP42, the writing process section 68 performs the writing process according to various operations performed by the user, as is the case with the first embodiment (see SP22 in FIG. 7).

At SP44, the host processor 60 checks whether or not an adjustment timing for a stroke has arrived. It is assumed here that "the time point at which a writing input of each of strokes has been completed" is set as the adjustment timing.

If an adjustment timing for a stroke has not arrived yet (SP44: NO), SP42 and SP44 are repeated one after the other until arrival of an adjustment timing. Meanwhile, if an adjustment timing has arrived (SP44: YES), control proceeds to the next SP46.

At SP46, the recognition process section 130 recognizes an object made up of one or a plurality of strokes, using stroke data generated latest at the time of SP44. This recognition process is performed through the learned discriminator 118. As a result, the first stroke group and the second stroke that have been written latest are recognized.

At SP48, the recognition process section 130 estimates the positional relation between the first stroke group and the second stroke recognized at SP46. This estimation process is performed through the learned estimator 120. As a result, the proper shape of the second stroke with respect to the first stroke group is obtained.

At SP50, the stroke adjustment section 132 determines whether or not the second stroke needs to be adjusted, referring to a result of the estimation at SP48. If the adjustment is not necessary (SP50: NO), control returns to SP42 without the stroke adjustment section 132 adjusting the second stroke. Meanwhile, if the adjustment is necessary (SP50: YES), control proceeds to the next SP52.

At SP52, the stroke adjustment section 132 performs an adjustment process on the basis of the positional relation estimated at SP48 such that the position or shape of the second stroke with respect to the first stroke group is optimized.

Figure 14:
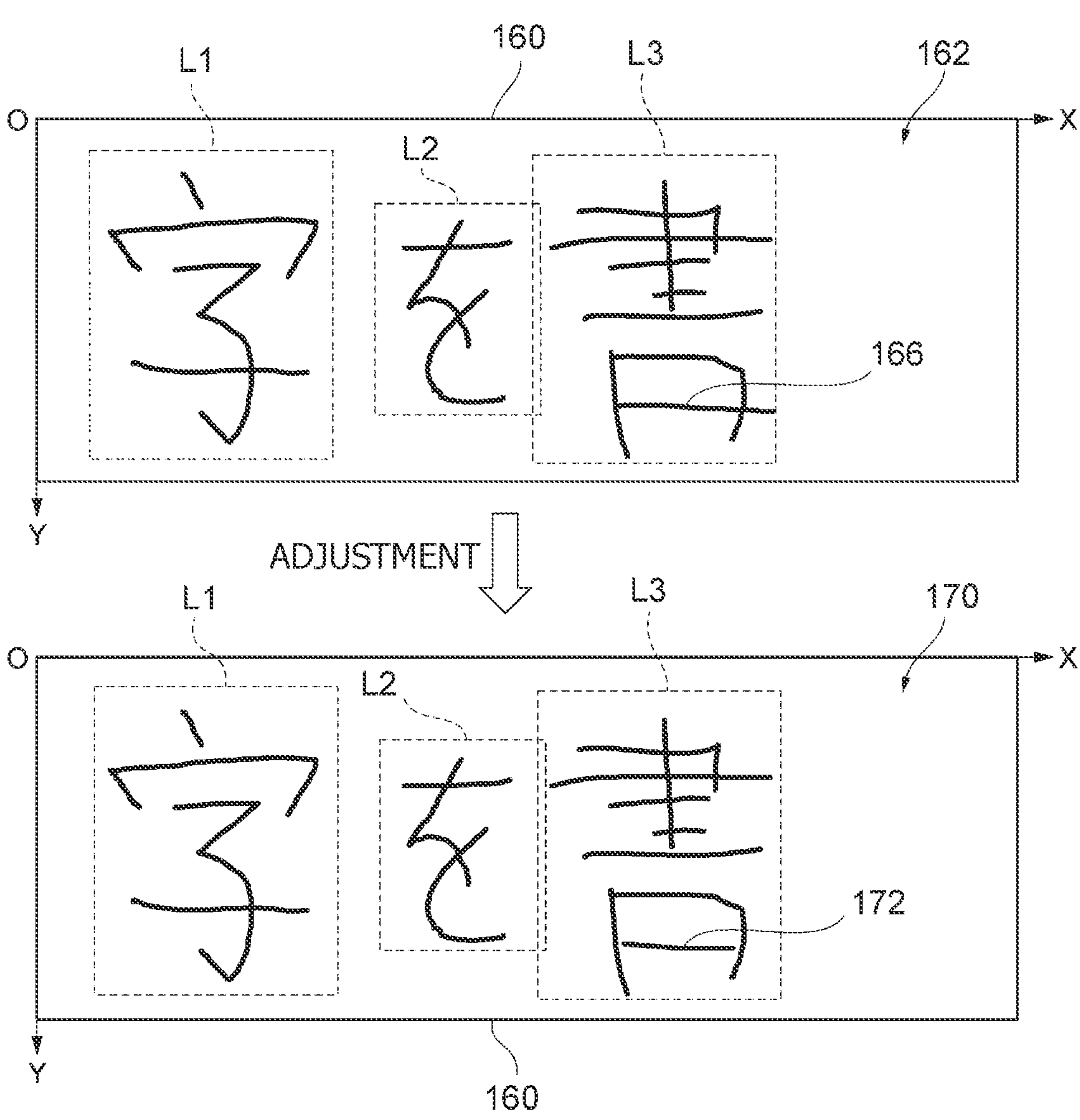
FIG. 14 is a diagram illustrating an example result of adjusting a stroke.

FIG. 14 is a diagram illustrating an example result of adjusting a stroke. An upper portion of the figure illustrates hand-written content before an adjustment process for the stroke is executed, while a lower portion of the figure illustrates the hand-written content after the adjustment process for the stroke is executed. In a whole region 160 of the sensor coordinate system, a stroke group 162 representing the hand-written content is arranged. The stroke group 162 represents a character string made up of kanji and hiragana characters. The character string is made up of three characters L1, L2, and L3 arranged in this order from the left side.

It is assumed, for example, that, with respect to the character L3, a second stroke 166 extending beyond a prescribed stop position has been inputted via a writing input after a writing input of a first stroke group 164. In this case, a process of adjusting the second stroke 166 with respect to the first stroke group 164 is started at a time point at which the writing input of the second stroke 166 has been completed. Then, in the whole region 160 of the sensor coordinate system, the stroke group 162 is automatically updated to a stroke group 170.

As a result, with the first stroke group 164 being fixed, a new second stroke 172 having a shortened end portion is formed, resulting in correction of the character L3 miswritten or erroneously written. Here, an adjustment that more appropriately reflects a tendency or peculiarity of the writing by the user can be performed by using an estimator 120 (or a second parameter group 126) customized on a user-by-user basis.

Thereafter, returning to SP42 in FIG. 13, the host processor 60 repeats SP42 to SP52 while the user is performing a writing operation, and adjusts a stroke when necessary. The processes in the flowchart illustrated in FIG. 13 are sequentially performed in the above-described manner.

Effects Achieved by Information Processing System 110

As described above, the user device 112, which is an information processing apparatus according to the second embodiment, includes the information acquisition section 66, which acquires learning information (here, the second parameter group 126) representing a result of learning on a spatial or semantic relation between strokes constituting an object, the recognition process section 130, which performs the recognition process on stroke data representing a collection of strokes to recognize the first stroke group 164 and the second stroke 166 inputted via a writing input after the first stroke group 164, the first stroke group 164 being made up of one or more strokes, and the stroke adjustment section 132, which performs the adjustment process on the stroke data on the basis of the second parameter group 126 acquired by the information acquisition section 66 such that the position or shape of the second stroke 166 is adjusted with the first stroke group 164 recognized by the recognition process section 130 being fixed.

According to an information processing program and a method in the second embodiment, one or a plurality of computers (here, the user device 112) perform the acts of: acquiring learning information (here, the second parameter group 126) representing a result of learning on a spatial or semantic relation between strokes constituting an object (SP40 in FIG. 13); performing the recognition process on stroke data representing a collection of strokes to recognize the first stroke group 164 and the second stroke 166 inputted via a writing input after the first stroke group 164, the first stroke group 164 being made up of one or more strokes (SP46); and performing the adjustment process on the stroke data on the basis of the acquired second parameter group 126 such that the position or shape of the second stroke 166 is adjusted with the recognized first stroke group 164 being fixed (SP52).

Adjusting the position or shape of the second stroke 166 on the basis of the acquired second parameter group 126 with the first stroke group 164 being fixed as described above makes it possible to automatically correct various types of information obtained through a writing operation at appropriate times.

In addition, the stroke adjustment section 132 may determine whether or not the adjustment process needs to be performed each time the writing input of the second stroke is finished. This enables the adjustment of the stroke to be performed before a new writing input is started by the user, which provides a support for the user.

Further, the stroke adjustment section 132 may perform the adjustment process in a case where the amount of change of the second stroke to be caused by the adjustment exceeds a threshold value. In this case, the adjustment is not performed in a case where the amount of change of the second stroke is small, which leads to a corresponding reduction in processing load.

Furthermore, the information acquisition section 66 may acquire the second parameter group 126 associated with a user who performs an operation of writing strokes, and, additionally, the stroke adjustment section 132 may perform the adjustment process in a manner suited to the user. An adjustment that more appropriately reflects a tendency or peculiarity of the writing by the user can be performed through the learning information customized on a user-by-user basis.

Third Embodiment

Next, a third embodiment of the present disclosure will be described below with reference to FIGS. 15 to 19. Note that members, sections, functions, etc., that have their equivalents in the first or second embodiment are denoted by the same reference characters as those of their equivalents in the first or second embodiment, and descriptions of such members, sections, functions, etc., may be omitted.

Overall Configuration of Information Processing System 200

Figure 15:
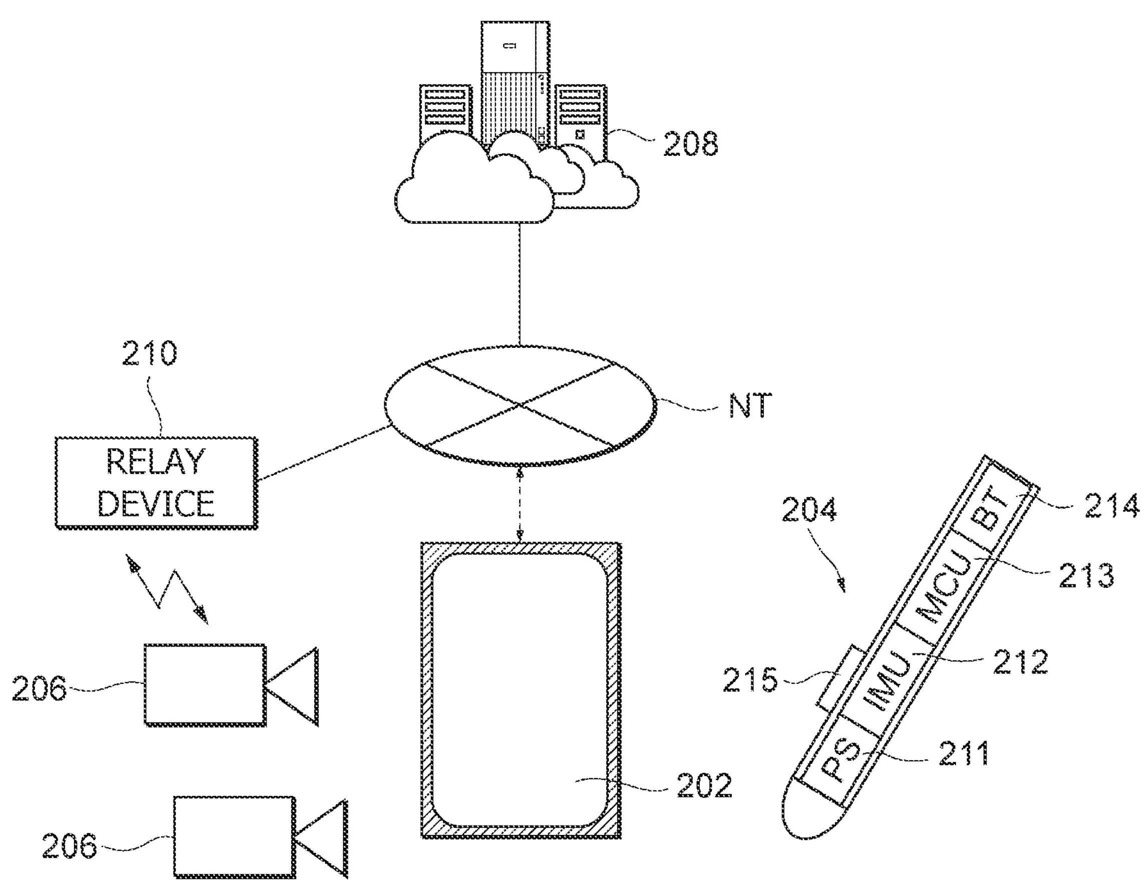
FIG. 15 is an overall configuration diagram of an information processing system according to a third embodiment of the present disclosure.

FIG. 15 is an overall configuration diagram of an information processing system 200 according to the third embodiment of the present disclosure. The information processing system 200 is provided to provide a "writing input service" of generating a digital ink through a writing input by a user.

This information processing system 200 specifically includes one or a plurality of user devices 202 (corresponding to a "detection device"), one or a plurality of electronic pens 204 (corresponding to a "pointing device"), one or a plurality of cameras 206 (corresponding to an "imaging device"), and a server device 208 (corresponding to an "information processing apparatus"). Each user device 202 and the server device 208 are configured to be capable of two-way communication therebetween via a relay device 210 and a network NT. In addition, the electronic pen 204 is configured to be capable of communicating with the server device 208 indirectly through the user device 202 or directly without an intermediary of the user device 202.

Similarly to the user devices 12 and 112 according to the first and second embodiments, respectively, the user device 202 is a computer owned by a user of the writing input service, and has a function of detecting a position indicated by the electronic pen 204. The user device 202 is formed by, for example, a tablet computer, a smart phone, a personal computer, or the like.

The electronic pen 204 is an input device configured to be capable of one-way or two-way communication with the user device 202. The electronic pen 204 specifically includes a pen pressure sensor 211, an inertial measurement unit (hereinafter referred to as an IMU 212), a micro control unit (hereinafter referred to as an MCU 213), a communication chip 214, and a side switch 215 (corresponding to an "operation unit"). Note here that the IMU 212 is an optional component, and may be omitted as necessary.

The pen pressure sensor 211 is, for example, a pressure sensor that uses a variable capacitor and senses a change in capacitance caused by a pressure onto a pen point. This pen pressure sensor 211 makes it possible to perform a function of detecting a pen pressure, and to detect a pen event, examples of which include a "pen down" and a "pen up" of the electronic pen 204.

The IMU 212 is, for example, a measuring unit including a combination of a triaxial gyro sensor and a three-axis acceleration sensor. The IMU 212 is thus configured to be capable of measuring state quantities indicating the state of the electronic pen 204 or the change over time of the state of the electronic pen 204. Examples of the state quantities include a variety of physical quantities used to identify the position/posture, such as, for example, positions, speeds, acceleration, jerks, angles, and angular velocities.

The MCU 213 is a control unit including a processor capable of controlling an operation of the electronic pen 204. For example, the MCU 213 performs various computations related to calculation of the position indicated by the electronic pen 204, and also performs control of transmission and reception of data, including results of the computations, and so on.

The communication chip 214 is an integrated circuit for performing wireless communication with an external device according to various wireless communication standards, including Bluetooth (registered trademark). The electronic pen 204 is thus capable of exchanging various pieces of data with the external device through the communication chip 214.

The side switch 215 is an operation unit for changing the settings at the time of writing, and is provided, for example, on a side of a housing of the electronic pen 204.

The camera 206 captures a place in which the electronic pen 204 is used, and acquires and outputs an imaging signal. In addition, through a communication function of the camera 206, the camera 206 transmits imaging data including the imaging signal to the server device 208 via the relay device 210 and the network NT.

The server device 208 is a computer that performs centralized control related to the writing input, and may be either of a cloud type or an on-premises type. Here, the server device 208 is depicted as a single computer in the figure, but the server device 208 may alternatively be implemented as a group of computers that form a distributed system.

Configuration of Server Device 208

Figure 16:
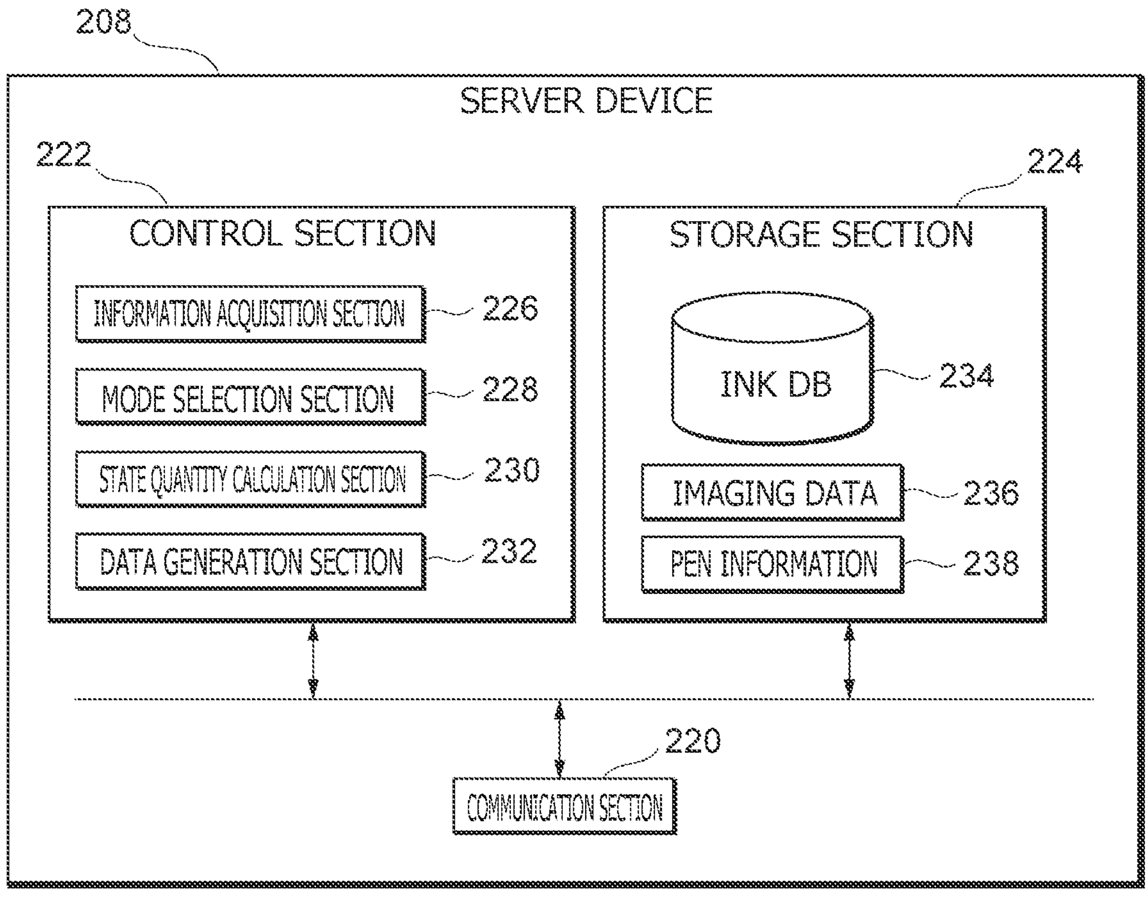
FIG. 16 is a block diagram illustrating an example configuration of a server device illustrated in FIG. 15.

FIG. 16 is a block diagram illustrating an example configuration of the server device 208 illustrated in FIG. 15. This server device 208 specifically includes a communication section 220, a control section 222, and a storage section 224.

The communication section 220 is an interface for transmitting and receiving electrical signals to and from an external device. The server device 208 is thus capable of exchanging various pieces of data, including digital inks, with the user device 202.

The control section 222 is formed by a processor including a CPU or a GPU. The control section 222 functions as an information acquisition section 226, a mode selection section 228, a state quantity calculation section 230, and a data generation section 232 by reading and executing a program and data stored in the storage section 224.

The information acquisition section 226 acquires various types of information required to calculate the state quantities of the electronic pen 204. Examples of such information include 1) imaging data 236 from the camera 206, 2) pen information 238 concerning the electronic pen 204, and 3) stroke data from the user device 202.

The mode selection section 228 selects one type of writing mode from among a plurality of predetermined types of writing modes. The types of writing modes are, for example, classified according to the definition of the position indicated by the electronic pen 204. The plurality of types of writing modes include 1) a "first writing mode" in which the position in a sensor coordinate space (i.e., a first coordinate space) corresponding to a sensor region on the user device 202 is calculated as the position indicated by the electronic pen 204, and 2) a "second writing mode" in which the position in a camera coordinate space (i.e., a second coordinate space) corresponding to a camera region of the camera 206 is calculated as the position indicated by the electronic pen 204.

The selection of the writing mode may be performed either manually or automatically. Examples of the manual selection include an operation on a user control displayed on an operation screen of the user device 202, and a pressing operation on the side switch 215 provided in the electronic pen 204. Examples of the automatic selection include a case where the camera 206 is brought into an ON state, a case where communication between the user device 202 and the electronic pen 204 has been enabled or disabled, and a case where no pen pressure acts on the electronic pen 204. For example, while a fact that no pen pressure is acting on the electronic pen 204 is detected, the mode selection section 228 may switch the mode between the first writing mode and the second writing mode according to an operation on the side switch 215 accepted through communication with the user device 202 or the electronic pen 204.

The state quantity calculation section 230 calculates state quantities indicating the state of the electronic pen 204, using various pieces of information acquired by the information acquisition section 226. Examples of the state quantities include physical quantities (e.g., the indicated position, inclination, and orientation, the rate of change over time of such quantities, etc.) related to the position/posture of the electronic pen 204, and physical quantities (e.g., pen pressure, etc.) that act on the electronic pen 204.

The state quantity calculation section 230 may, for example, calculate the state quantities employing a different computation method depending on the type of the writing mode. In the case of the first writing mode, the state quantity calculation section 230 calculates coordinate values in a sensor coordinate space 250 (see FIG. 18) as the position indicated by the electronic pen 204, and calculates the value measured by the pen pressure sensor 211 as the pen pressure acting on the electronic pen 204. A method for calculating the indicated position or the pen pressure is basically similar to a calculation method executed by a touch IC (not illustrated) integrated in the user device 202.

Meanwhile, in the case of the second writing mode, the state quantity calculation section 230 calculates coordinate values in a camera coordinate space 260 (see FIG. 18) as the position indicated by the electronic pen 204, and calculates, as the pen pressure acting on the electronic pen 204, a value calculated on the basis of a movement of the electronic pen 204. For example, the state quantity calculation section 230 detects a position of the pen point included in an image region represented by each of pieces of imaging data 236, and calculates the position indicated by the electronic pen 204, using a triangulation technique on the basis of a known geometrical relation between the plurality of cameras 206. For example, the state quantity calculation section 230 calculates the pen pressure acting on the electronic pen 204 such that the pen pressure decreases as the moving speed of the electronic pen 204 increases. Note that, in a case where the presence or position of the electronic pen 204 has not been detected through use of the imaging data 236, the state quantity calculation section 230 may use values measured by the IMU 212 installed in the electronic pen 204 to calculate the state quantities (e.g., the indicated position, pen pressure, etc.) of the electronic pen 204.

The data generation section 232 generates the digital ink including the stroke data, using the state quantities calculated by the state quantity calculation section 230. Space coordinates of a stroke group described by the stroke data vary between the first writing mode and the second writing mode.

The storage section 224 stores a program and data required for the control section 222 to control constituent elements. The storage section 224 is formed by a non-transitory computer-readable storage medium. In the storage section 224, a database (i.e., an ink DB 234) related to the digital inks is constructed, and the imaging data 236 and the pen information 238 are stored.

The imaging data 236 includes imaging signals outputted from each of the plurality of cameras 206, and geometrical information for identifying relative positions of the plurality of cameras 206. The imaging data 236 is stored so as to be associated with the electronic pen 204 or the user of the electronic pen 204.

The pen information 238 may include information held or generated by the electronic pen 204, and also may include information obtained through detection of the electronic pen 204 by the user device 202. Examples of the former information include identification information (i.e., a pen ID) of the electronic pen 204, the type of the electronic pen 204, and the state of an operation unit, examples of which include the side switch 215. Examples of the latter information include the position, inclination, orientation, etc., of the electronic pen 204 detected in the sensor coordinate space 250.

Operation of Information Processing System 200

The information processing system 200 according to the third embodiment has the above-described configuration. Next, an operation of the information processing system 200 will be described below with reference to a flowchart of FIG. 17 and FIGS. 18 and 19.

Figure 17:
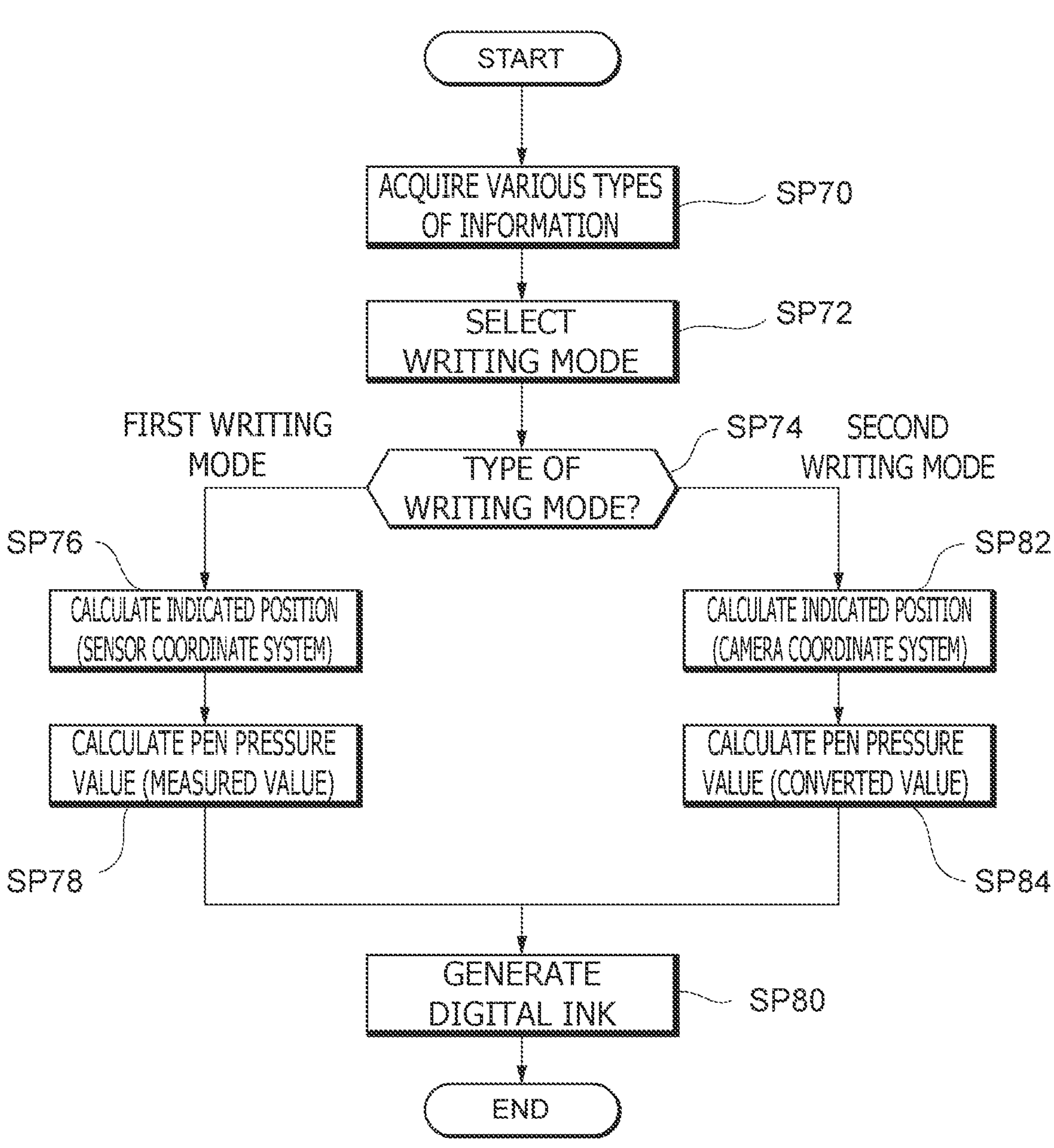
FIG. 17 is a flowchart illustrating an example operation in which the server device illustrated in FIG. 15 generates stroke data.

At SP70 in FIG. 17, the control section 222 (more specifically, the information acquisition section 226) of the server device 208 acquires, from an external device, various types of information required to calculate the state quantities of the electronic pen 204. Here, the external device(s) is at least one of the user device 202, the cameras 206, and the electronic pen 204.

At SP72, the mode selection section 228 refers to the various types of information acquired at SP70, and selects one of the first writing mode and the second writing mode.

At SP74, the state quantity calculation section 230 checks the type of the writing mode selected at SP72. In a case where the first writing mode has been selected (SP74: FIRST WRITING MODE), control proceeds to the next SP76.

At SP76, the state quantity calculation section 230 calculates coordinate values in the sensor coordinate space 250 as the position indicated by the electronic pen 204. That is, the state quantity calculation section 230 uses the position indicated by the electronic pen 204 as it is, the position being included in the pen information 238.

Figure 18:
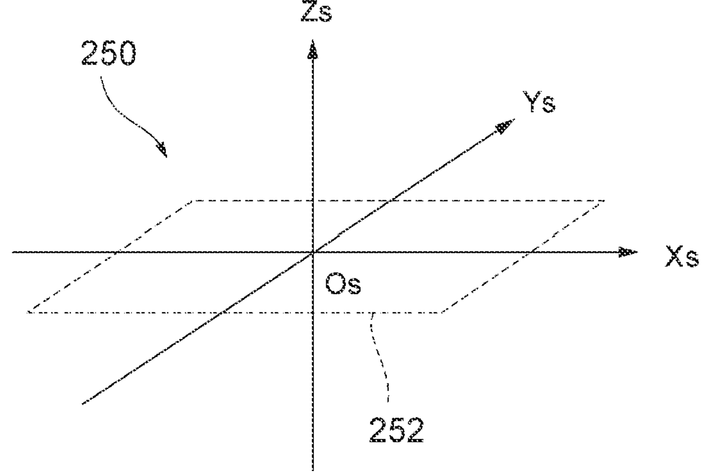
FIG. 18 is a diagram illustrating a correspondence between a sensor coordinate system and a camera coordinate system.
Figure 18:
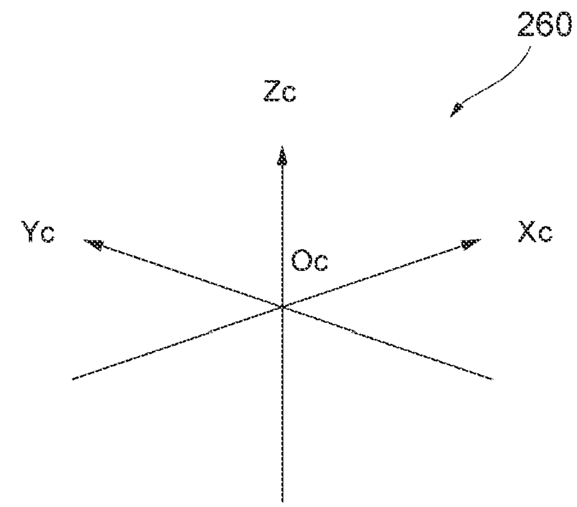

FIG. 18 is a diagram illustrating a correspondence between the sensor coordinate space 250 and the camera coordinate space 260. The sensor coordinate space 250, illustrated in an upper portion of the figure, is a three-dimensional orthogonal coordinate system having an Xs-axis, a Ys-axis, and a Zs-axis, and is defined independently by the user device 202. A quadrilateral region represented by a broken line corresponds to a sensor region 252 formed by a touch surface of the user device 202.

At SP78 in FIG. 17, the state quantity calculation section 230 calculates the value measured by the pen pressure sensor 211 as the pen pressure acting on the electronic pen 204. That is, the state quantity calculation section 230 uses a pen pressure value of the electronic pen 204 as it is, the pen pressure value being included in the pen information 238.

At SP80, the data generation section 232 generates a digital ink corresponding to the first writing mode, using the state values calculated at SP76 and SP78. The server device 208 thus finishes the operation illustrated in the flowchart of FIG. 17.

Meanwhile, returning to SP74 in FIG. 17, in a case where the second writing mode has been selected (SP74: SECOND WRITING MODE), the state quantity calculation section 230 proceeds to SP82, which is different from SP76.

At SP82, the state quantity calculation section 230 calculates coordinate values in the camera coordinate space 260 as the position indicated by the electronic pen 204. Specifically, the state quantity calculation section 230 identifies the position of the pen point in each of images represented by the imaging data 236, and thereafter converts the identified positions to a position in the camera coordinate space 260, employing a known method, such as the triangulation technique.

The camera coordinate space 260, illustrated in a lower portion of FIG. 18, is a three-dimensional orthogonal coordinate system having an Xc-axis, a Yc-axis, and a Zc-axis, and is defined independently by the server device 208. Note that the sensor coordinate space 250 and the camera coordinate space 260 are defined independently of each other, but may be aligned with each other.

At SP84 in FIG. 17, the state quantity calculation section 230 calculates a value corresponding to the movement of the electronic pen 204 as the pen pressure acting on the electronic pen 204. A specific method for calculating the pen pressure value will be described below with reference to FIG. 19.

Figure 19:
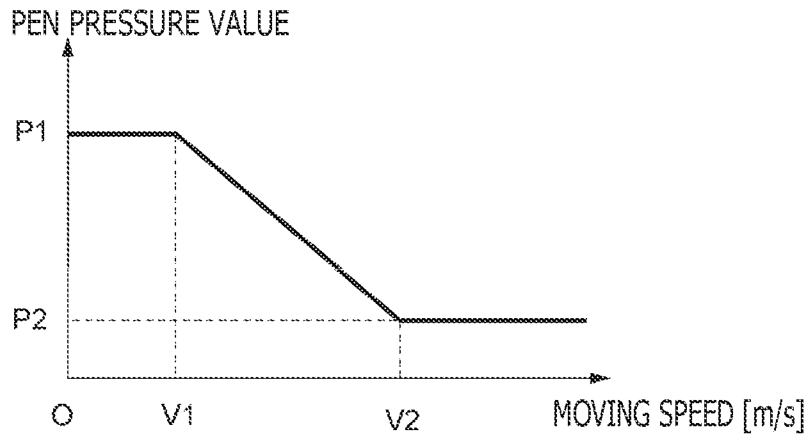
FIG. 19 is a graph illustrating an example method for calculating a pen pressure value in a second writing mode.

FIG. 19 is a graph illustrating an example method for calculating the pen pressure value in the second writing mode. A horizontal axis of the graph represents the moving speed V (unit: mm/s) of the electronic pen 204, while a vertical axis of the graph represents the pen pressure value P (unit: none). When the moving speed is equal to or lower than V1 ($0 \leq V \leq V1$), the pen pressure value is regarded as constant (P=P1). When the moving speed is higher than V1 and equal to or lower than V2 ($V1 < V \leq V2$), the pen pressure value gradually decreases as the moving speed increases. When the moving speed is higher than V2 ($V \geq V2$), the pen pressure value is regarded as constant (P=P2). Determining the pen pressure value according to a characteristic curve as described above can reproduce a virtual behavior of the pen pressure when the electronic pen 204 is in a contacted state, even when the electronic pen 204 is actually in a hovering state.

At SP80 in FIG. 17, the data generation section 232 generates a digital ink corresponding to the second writing mode, using the state values calculated at SP82 and SP84. The server device 208 thus finishes the operation illustrated in the flowchart of FIG. 17.

Effects Achieved by Information Processing System 200

As described above, the information processing system 200 according to the third embodiment includes a pointing device (here, the electronic pen 204) for indicating a position; a detection device (here, the user device 202) that detects the position indicated by the electronic pen 204, an imaging device (here, the camera 206) that captures a place in which the electronic pen 204 is used, and acquires an imaging signal, and an information processing apparatus (here, the server device 208) configured to be capable of communicating with the user device 202 and/or the camera 206.

The server device 208 includes the state quantity calculation section 230, which selectively executes one of the first writing mode in which a position in the first coordinate space (here, the sensor coordinate space 250) corresponding to the sensor region 252 on the user device 202 is calculated as the position indicated by the electronic pen 204, and the second writing mode in which a position in the second coordinate space (here, the camera coordinate space 260) corresponding to an imaging region 262 of the camera 206 is calculated as the position indicated by the electronic pen 204 and the data generation section 232, which generates a digital ink describing one or a plurality of strokes each representing a locus of the position in the sensor coordinate space 250 or the camera coordinate space 260 calculated by the state quantity calculation section 230.

According to an information processing program and a method in the third embodiment, the server device 208 performs the acts of selectively executing one of the first writing mode in which a position in the sensor coordinate space 250 corresponding to the sensor region 252 on the user device 202 is calculated as the position indicated by the electronic pen 204, and the second writing mode in which a position in the camera coordinate space 260 corresponding to the imaging region 262 of the camera 206 is calculated as the position indicated by the electronic pen 204 (SP76 and SP82 in FIG. 17), and generating a digital ink describing one or a plurality of strokes each representing a locus of the calculated position in the sensor coordinate space 250 or the camera coordinate space 260 (SP80).

When one of the first writing mode in which a position in the sensor coordinate space 250 is calculated as the position indicated by the electronic pen 204, and the second writing mode in which a position in the camera coordinate space 260 corresponding to the imaging region 262 of the camera 206 is calculated as the position indicated by the electronic pen 204, is selectively executed as described above, appropriate use of the two types of coordinate spaces for writing input of strokes is made possible.

In addition, in a case where the pointing device is the electronic pen 204 having the function of detecting the pen pressure, the state quantity calculation section 230 may at least execute the second writing mode while a fact that no pen pressure is acting on the electronic pen 204 is detected.

Further, in a case where the electronic pen 204 further includes an operation unit (here, the side switch 215), the state quantity calculation section 230 may selectively execute one of the first writing mode and the second writing mode according to an operation of the side switch 215 accepted via communication with the user device 202 or the electronic pen 204.

Furthermore, while the state quantity calculation section 230 is executing the second writing mode, the state quantity calculation section 230 may calculate, as the pen pressure, a value corresponding to a movement of the electronic pen 204, instead of a pen pressure acting on the electronic pen 204.

Example Modifications

It is needless to say that the present disclosure is not limited to the above-described embodiments, and that various modifications can be made thereto without departing from the gist of this disclosure. Also note that various features thereof may be combined arbitrarily as long as no technical conflict arises.

The various embodiments described above can be combined to provide further embodiments. All of the U.S.

patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An information processing apparatus comprising:

a processor; and a memory storing instructions that, when executed by the processor, cause the information processing apparatus to:

acquire learning information representing a result of learning on a spatial relation between adjacent objects, wherein the learning information is associated in the memory with identification information that identifies a user account, the information processing apparatus, or an electronic pen that performs writing input via the information processing apparatus;

perform a recognition process on stroke data representing a collection of strokes to recognize a first object and a second object that has been inputted via a writing input after the first object; and perform an adjustment process on the stroke data based on the learning information such that a position or size of the second object is adjusted with the first object being fixed wherein:

the learning information includes a first parameter group and a second parameter group, the first parameter group includes parameters that identify an algorithm of a discriminator, the second parameter group includes parameters that identify an algorithm of an estimator, the recognition process recognizes the first object and the second object based on the discriminator, and the recognition process recognizes a positional relation between the first object and the second object based on the estimator.

2. The information processing apparatus according to claim 1, wherein the instructions, when executed by the processor, cause the information processing apparatus to:

select one type of execution timing from among a plurality of types of execution timings.

3. The information processing apparatus according to claim 2, wherein:

the plurality of types of execution timings include a time point at which the objects have been identified before the writing input of the second object is completed.

4. The information processing apparatus according to claim 1, wherein, the adjustment process adjusts a position in at least one of a row direction, a heightwise direction, and a rotation direction.

5. The information processing apparatus according to claim 1, wherein the instructions, when executed by the processor, cause the information processing apparatus to:

acquire learning information representing a result of learning on a spatial or semantic relation between strokes constituting an object;

perform a recognition process on stroke data representing a collection of strokes to recognize a first stroke group and a second stroke inputted via a writing input after the first stroke group, the first stroke group being made up of one or more strokes; and perform an adjustment process on the stroke data based on the learning information such that a position or shape of the second stroke is adjusted with the first stroke group being fixed.

6. The information processing apparatus according to claim 5, wherein the instructions, when executed by the processor, cause the information processing apparatus to:

determine whether the adjustment process needs to be performed each time the writing input of the second stroke is finished.

7. The information processing apparatus according to claim 6, wherein the instructions, when executed by the processor, cause the information processing apparatus to:

perform the adjustment process in a case where an amount of change of the second stroke to be caused by an adjustment exceeds a threshold value.

8. The information processing apparatus according to claim 5, wherein the instructions, when executed by the processor, cause the information processing apparatus to:

acquire the learning information associated with a user who performs an operation of writing the strokes, and perform the adjustment process in a manner suited to the user.

9. A non-transitory computer-readable storage medium storing one or more information processing programs that, when executed by one or more processors, cause one or more computers to:

acquire learning information representing a result of learning on a spatial relation between adjacent objects, wherein the learning information is associated in the storage medium with identification information that identifies a user account, an information processing apparatus, or an electronic pen that performs writing input via the information processing apparatus;

perform a recognition process on stroke data representing a collection of strokes to recognize a first object and a second object that has been inputted via a writing input after the first object; and perform an adjustment process on the stroke data based on the learning information such that a position or size of the second object is adjusted with the first object being fixed wherein:

the learning information includes a first parameter group and a second parameter group, the first parameter group includes parameters that identify an algorithm of a discriminator, the second parameter group includes parameters that identify an algorithm of an estimator, the recognition process recognizes the first object and the second object based on the discriminator, and the recognition process recognizes a positional relation between the first object and the second object based on the estimator.

10. The storage medium according to claim 9, wherein the one or more information processing programs, when executed by the one or more processors, cause the one or more computers to:

acquire learning information representing a result of learning on a spatial or semantic relation between strokes constituting an object;

perform a recognition process on stroke data representing a collection of strokes to recognize a first stroke group and a second stroke inputted via a writing input after the first stroke group, the first stroke group being made up of one or more strokes; and perform an adjustment process on the stroke data based on the learning information such that the second stroke is adjusted with the first stroke group being fixed.

* * * * *